US008119205B2

(12) United States Patent
Roa et al.

(10) Patent No.: US 8,119,205 B2
(45) Date of Patent: Feb. 21, 2012

(54) PROCESS FOR PREPARING PALLADIUM ALLOY COMPOSITE MEMBRANES FOR USE IN HYDROGEN SEPARATION, PALLADIUM ALLOY COMPOSITE MEMBRANES AND PRODUCTS INCORPORATING OR MADE FROM THE MEMBRANES

(75) Inventors: Fernando Roa, Golden, CO (US); J. Douglas Way, Boulder, CO (US); Stephen N. Paglieri, White Rock, NM (US)

(73) Assignee: Colorado School of Mines, Golden, CO (US)

( * ) Notice: Subject to any disclaimer, the term of this patent is extended or adjusted under 35 U.S.C. 154(b) by 0 days.

(21) Appl. No.: 11/381,488

(22) Filed: May 3, 2006

(65) Prior Publication Data
US 2006/0188737 A1 Aug. 24, 2006

Related U.S. Application Data

(62) Division of application No. 10/249,387, filed on Apr. 3, 2003, now abandoned.

(60) Provisional application No. 60/369,674, filed on Apr. 3, 2002.

(51) Int. Cl.
B05D 5/00 (2006.01)
B05D 3/02 (2006.01)
B01D 71/02 (2006.01)
C01B 3/50 (2006.01)
C22C 1/00 (2006.01)
C23C 18/16 (2006.01)

(52) U.S. Cl. .................. 427/404; 427/383.1; 427/383.3

(58) Field of Classification Search .................. 427/404, 427/383.1, 383.3
See application file for complete search history.

(56) References Cited

U.S. PATENT DOCUMENTS

| | | | |
|---|---|---|---|
| 2,773,561 A | 12/1956 | Hunter | |
| 3,350,845 A | 11/1967 | McKinley | |
| 3,439,474 A | 4/1969 | McKinley | |
| 3,849,076 A | 11/1974 | Gryaznov et al. | |
| 3,881,891 A | 5/1975 | Goltsov et al. | |
| 4,179,470 A | 12/1979 | Mischenko et al. | |
| 4,313,013 A | 1/1982 | Harris | |
| 4,911,803 A | 3/1990 | Kunz | |
| 5,139,541 A | 8/1992 | Edlund | |
| 5,149,420 A | 9/1992 | Buxbaum et al. | |
| 5,215,729 A | 6/1993 | Buxbaum | |
| 5,451,386 A | 9/1995 | Collins et al. | |
| 5,498,278 A | 3/1996 | Edlund | |
| 5,518,053 A | 5/1996 | Robison | |
| 5,518,530 A | 5/1996 | Sakai et al. | |
| 5,645,626 A | 7/1997 | Edlund et al. | |
| 5,652,020 A | 7/1997 | Collins et al. | |
| 5,738,708 A | 4/1998 | Peachey et al. | |
| 5,888,273 A | 3/1999 | Buxbaum | |
| 5,904,754 A | 5/1999 | Juda et al. | |
| 5,931,987 A | 8/1999 | Buxbaum | |
| 5,980,989 A | 11/1999 | Takahashi et al. | |
| 5,997,594 A | 12/1999 | Edlund et al. | |
| 6,086,729 A | 7/2000 | Bredesen et al. | |
| 6,103,028 A | 8/2000 | Juda et al. | |
| 6,152,984 A | 11/2000 | Drnevich | |
| 6,152,987 A * | 11/2000 | Ma et al. ........................... 95/56 |
| 6,152,995 A | 11/2000 | Edlund | |
| 6,168,650 B1 | 1/2001 | Buxbaum | |
| 6,171,574 B1 | 1/2001 | Juda et al. | |
| 6,183,543 B1 | 2/2001 | Buxbuam | |
| 6,214,090 B1 | 4/2001 | Dye et al. | |
| 6,221,117 B1 | 4/2001 | Edlund et al. | |
| 6,238,465 B1 | 5/2001 | Juda et al. | |
| 6,267,801 B1 | 7/2001 | Baake et al. | |
| 6,319,306 B1 | 11/2001 | Edlund et al. | |
| 6,372,363 B1 | 4/2002 | Krueger | |
| 6,375,906 B1 | 4/2002 | Edlund et al. | |
| 6,376,113 B1 | 4/2002 | Edlund et al. | |
| 6,383,670 B1 | 5/2002 | Edlund et al. | |
| 6,416,729 B1 | 7/2002 | DeBerry et al. | |
| 6,419,728 B1 | 7/2002 | Edlund | |
| 6,451,464 B1 | 9/2002 | Edlund et al. | |
| 6,458,189 B1 | 10/2002 | Edlund et al. | |
| 6,461,408 B2 | 10/2002 | Buxbaum | |
| 6,465,118 B1 | 10/2002 | Dickman et al. | |
| 6,494,937 B1 | 12/2002 | Edlund et al. | |
| 6,495,227 B1 | 12/2002 | Cahuzac | |
| 6,537,352 B2 | 3/2003 | Edlund et al. | |
| 6,540,813 B2 | 4/2003 | Nelson et al. | |
| 6,541,676 B1 | 4/2003 | Franz et al. | |
| 6,562,111 B2 | 5/2003 | Edlund et al. | |
| 6,569,227 B2 | 5/2003 | Edlund et al. | |
| 6,576,350 B2 | 6/2003 | Buxbaum | |
| 6,596,057 B2 | 7/2003 | Edlund et al. | |

(Continued)

FOREIGN PATENT DOCUMENTS
EP 0783919 A1 7/1997
(Continued)

OTHER PUBLICATIONS

U.S. Appl. No. 11/7698,188, filed Jun. 25, 2007, Way.

(Continued)

*Primary Examiner* — William Phillip Fletcher, III
(74) *Attorney, Agent, or Firm* — Sheridan Ross P.C.

(57) ABSTRACT

The invention is directed to a method for producing Palladium alloy composite membranes that are useful in applications that involve the need to separate hydrogen from a gas mixture. The method includes providing a substrate for supporting a palladium alloy film, seeding the support surface with palladium crystallites to produce an activated surface, first plating, over the activated surface, a palladium film, second plating, over the palladium film, an alloying material other than silver, and annealing the porous substrate, palladium film, and alloying material so that there is intermetallic diffusion of the alloying material into the palladium film to produce a palladium alloy film over the porous substrate.

20 Claims, 13 Drawing Sheets

U.S. PATENT DOCUMENTS

| | | | |
|---|---|---|---|
| 6,761,929 B2 * | 7/2004 | Damle | 427/238 |
| 6,916,454 B2 * | 7/2005 | Alvin | 422/211 |
| 2002/0020298 A1 | 2/2002 | Drost et al. | |
| 2003/0190486 A1 | 10/2003 | Roa et al. | |
| 2005/0109609 A1 | 5/2005 | Rei et al. | |
| 2006/0093848 A1 | 5/2006 | Senkevich et al. | |

FOREIGN PATENT DOCUMENTS

| | | |
|---|---|---|
| EP | 1096026 A2 | 5/2001 |
| JP | 63295402 | 1/1988 |
| JP | 63-294925 | 12/1988 |
| JP | 8-266876 | 10/1996 |
| JP | 9-029079 | 2/1997 |
| JP | 10-203802 | 8/1998 |
| WO | 01/53005 A1 | 7/2001 |

OTHER PUBLICATIONS

Hollein et al. "Preparation and characterization of palladium composite membranes for hydrogen removal in hydrocarbon dehydrogenation membranes reactors", Catalysis Today 67 (2001), p. 33-42.

Morreale et al., J. Membr. Sci., 241: 219 (2004).

Rodina et al., "The Interaction of Hydrogen with Certain Palladium—Gold and Palladium—Silver—Gold Alloys", Russian Journal of Physical Chemistry, 45(5), 1971.

Zhao et al. "Preparation and characterization of palladium-based composite membranes by electroless plating and magnetron sputtering", Catalysis Today 56 (2000), p. 89-96.

Supplementary European Search Report for European Patent Application No. 03718215, completed Jan. 11, 2006.

S.-E. Nam, S.-H. Lee, and K.-H. Lee, "Preparation of a Palladium Alloy Composite Membrane Supported in a Porous Stainless Steel by Vacuum Electrodeposition," Journal of Membrane Science, Jan. 10, 1999, pp. 163-173, vol. 153, Issue 2, Elsevier Science, B.V., United Kingdom.

A. Li, G. Xiong, J. Gu and L. Zheng, "Preparation of Pd/Ceramic Composite Membrane 1. Improvement of the Conventional Preparation Technique", Journal of Membrane Science, 1996, pp. 257-260, 110, Elsevier Science B.V., Amsterdam, The Netherlands.

T.S. Dorling, B.W.J. Lynch and R.L. Moss, "The Structure and Activity of Supported Metal Catalysts", Journal of Catalysis, 1971, pp. 190-201, 20, Academic Press, London, United Kingdom.

L.Q. Wu, N. Xu and J. Shi, "Preparation of a Palladium Composite Membrane by an Improved Electroless Plating Technique", Industrial & Engineering Chemistry Research, 2000, pp. 342-348, 39, American Chemical Society, Washington, DC, USA.

S. Uemiya, N. Sato, H. Ando, Y. Kude, T. Matsuda and E. Kikuchi, "Separation of Hydrogen Through Palladium Thin Film Supported on a Porous Glass Tube", Journal of Membrane Science, 1991, pp. 303-313, 56, Elsevier Science Publishers B.V., Amsterdam, The Netherlands.

S.E. Nam and K.H. Lee, "Hydrogen Separation by Pd Alloy Composite Membranes: Introduction of Diffusion Barrier", Journal of Membrane Science, 2001, pp. 177-185, 192, Elsevier Science B.V., Amsterdam, The Netherlands.

F. Roa, M.J. Block and J.D. Way, "The Influence of Alloy Composition on the H2 Flux of Composite Pd—Cu Membranes", Desalination, 2002, pp. 411-416, 147, Elsevier Science B.V., Amsterdam, The Netherlands.

V. Gryaznov, "Membrane Catalysts", Catalysis Today, 1999, pp. 391-395, 51, Elsevier Science B.V., Amsterdam, The Netherlands.

R.E. Buxbaum and A.B. Kinney, "Hydrogen Transport Through Tubular Membranes of Palladium-Coated Tantalum and Niobium", Industrial & Engineering Chemistry Research, 1996, pp. 530-537, 35, American Chemical Society, Washington, DC, USA.

V.M. Gryaznov, M.M. Ermilova, S.I. Zavodchenko and N.V. Orekhova, "Hydrogen Permeability of Some Metallopolymer Membranes", Polymer Science, 1993, pp. 365-368, 35-#3, Russian Academy of Sciences, Moscow, Russia.

N. M. Peachey, R.C. Snow and R.C. Dye, "Composite Pd/Ta Metal Membranes for Hydrogen Separation", Journal of Membrane Science, 1996, pp. 123-133, 111, Elsevier Science B.V., Amsterdam, The Netherlands.

J.N. Armor, "Membrane Catalysis: Where Is It Now, What Needs to Be Done?", Catalysis Today, 1995, pp. 199-207, 25, Elsevier Science B.V., Amsterdam, The Netherlands.

G. Saracco, H.W.J.P. Neomagus, G.F. Versteeg and W.P.M. Van Swaaij, "High-Temperature Membrane Reactors: Potential and Problems", Chemical Engineering Science, 1999, pp. 1997-2017, 54, Elsevier Science Ltd., Oxford, United Kingdom.

S. Uemiya, "State-of-the-Art of Supported Metal Membranes for Gas Separation", Separation and Purification Methods 1999, pp. 51-85, 28-#1, Marcel Dekker, Inc., New York, USA.

J.B. Hunter, "A New Hydrogen Purification Process", Platinum Metals Review, 1960, pp. 130-131, 4, Johnson Matthey PLC, London, United Kingdom.

J.K. Ali, P. Hasler, E.J. Newson and D.W.T. Rippin, "Irreversible Poisoning of Pd—Ag Membranes", International Journal of Hydrogen Energy, 1994, pp. 877-880, 19-#11, Elsevier Science ltd., London, United Kingdom.

J.P. Collins, R.W. Schwartz, R. Sehgal, T.L. Ward, C.J. Brinker, G.P. Hagen and C.A. Udovich, "Catalytic Dehydrogenation of Propane in Hydrogen Permselective Membrane Reactors", Industrial & Engineering Chemistry Research, 1996, pp. 4398-4405, 35-#12, American Chemical Society, Washington, DC, USA.

H.S. Foley, A.W. Wang, B. Johnson and J.N. Armor, "Effect of a Model Hydrogenation on a Catalytic Palladium Membrane", Selectivity in Catalysis, 1993, pp. 168-184, American Chemical Society—published by Oxford University Press, United Kingdom.

J.N. Armor, "Applications of Catalytic Inorganic Membrane Reactors to Refinery Products", Journal of Membrane Science, 1998, pp. 217-233, 147, Elsevier Science B.V., Amsterdam, The Netherlands.

G.J. Grashoff, C.E. Pilkington and C.W. Corti, "The Purification of Hydrogen—a Review of the Technology Emphasising the Current Status of Palladium Membrane Diffusion", Platinum Metals Review, 1982, pp. 157-169, 27-#4, Johnson Matthey PLC, London, United Kingdom.

D.T. Hughes and I.R. Harris, "A Comparative Study of Hydrogen Permeabilities and Solubilities in Some Palladium Solid Solution Alloys", Journal of Less-Common Metals, 1978, pp. P9-P21, 61, Elsevier Sequoia S.A., Lausanne, The Netherlands.

V.M. Gryaznov, A.P. Mishchenko, V.P. Polyakova, N.R. Roshan, E.M. Savitskii, V.S. Smirnov, E.V. Khrapova and V.I. Shimulis, "Palladium-Ruthenium Alloys as Membrane Catalysts", Dokl. Akad. Nauk SSSR, Jul. 1973, pp. 624-627, 211-#3, Russian Academy of Sciences, Moscow, Russia.

D. Edlund, "A Membrane Reactor for H2S Decomposition", FETC 1996 Conference Proceedings: Advanced Coal-Fired Power Systems '96 Review Meeting, Morgantown, West Virginia, Jul. 16-18, 1996, pp. 1-9, U.S. Department of Energy, Office of Fossil Energy, USA.

F.N. Berseneva, N.I. Timofeev and A.B. Zakharov, "Alloys of Palladium With Metals of the Platinum Group as Hydrogen-Permeable Membrane components at High Temperature of Gas Separation", International Journal of Hydrogen Energy, 1993, pp. 15-18, 18-#1, Pergamon Press Ltd., Great Britain.

F.A. Lewis, The Palladium Hydrogen System, 1967, pp. 70-71, 78-79, 82-85, 116-117, and 144-145, Academic Press, London, United Kingdom.

G. Alefeld and J. Völkl (eds), Hydrogen in Metals I: Basic Properties, 1978, pp. 324-326, 342-348, 1, Springer-Verlag, Berlin, Germany.

J. Piper, "Diffusion of Hydrogen in Copper-Palladium Alloys", Journal of Applied Physics, 1966, pp. 715-721, 37-#2, American Institute of Physics, New York, USA.

A.G. Knapton, "Palladium Alloys for Hydrogen Diffusion Membranes", Platinum Metals Review, 1977, pp. 44-50, 21, Johnson Matthey PLC, London, United Kingdom.

A.S. Zetkin, G.YE. Kagan and YE.S. Levin, "Influence of Structural Transformations on the Diffusion Parameters of Deuterium in Palladium-Copper Alloys", Phys. Met. Metall., 1987, pp. 130-134, 64-#5, Pergamon Press PLC, Poland.

A.S. Zetkin, G.E. Kagan, A.N. Varaksin and E.S. Levin, "Diffusion and Penetrability of Deuterium in the Alloy Pd-53 at % Cu", Soy. Phys. Solid State, 1992, pp. 83-85, 34-#1,-American Institute of Physics, New York, USA.

R.A. Karpova and I.P. Tverdovskii, "Sorption of Hydrogen by Disperse Palladium-Copper Alloys", Russ. J. Phys. Chem., 1959, pp. 1393-1400, 33-#6, Leningrad (English summary at end of article).

T.B. Flanagan and D.M. Chisdes, "Solubility of Hydrogen (1 atm, 298 K) in Some Copper/Palladium Alloys", Solid State Communications, 1975, pp. 529-532, 16, Pergamon Press, Great Britain.

D. Fisher, D.M. Chisdes and T.B. Flanagan, "Solution of Hydrogen in Palladium/Copper Alloys", Journal of Solid State Chemistry, 1977, pp. 149-158, 20, Academic Press Inc., Great Britain.

M. Van Swaay and C.E. Birchenall, "Permeability and Diffusion of Hydrogen Through Palladium", Transactions of the Metallurgical Society of AIME, Apr. 1960, pp. 285-289, 218, The Metallurgical Society of AIME, USA.

A.N. Karavanov and V.M. Gryaznov, "Hydrogenation of Acetylenic and Ethylenic Alcohols in the Liquid Phase on Membrane Catalysts Consisting of Binary Alloys of Palladium With Nickel and Ruthenium", Kinet. Catal., 1984, pp. 56-60, 25, Plenum Publishing Corporation, New York, USA.

G. Barbieri, V. Violante, F.P. Di Maio, A. Criscuoli and E. Drioli, "Methane Steam Reforming Analysis in a Palladium-Based Catalytic Membrane Reactor", Industrial & Engineering Chemistry Research, 1997, pp. 3369-3374, 36, American Chemical Society, Washington, DC, USA.

J. Shu, B.P.A. Grandjean, E. Ghali and S. Kaliaguine, "Simultaneous Deposition of Pd and Ag on Porous Stainless Steel by Electroless Plating", Journal of Membrane Science, 1993, pp. 181-195, 77, Elsevier Science Publishers B.V., Amsterdam, The Netherlands.

S. Uemiya, T. Matsuda and E. Kikuchi, "Hydrogen Permable Palladium-Silver Alloy Membrane Supported on Porous Ceramics", Journal of Membrane Science, 1991, pp. 315-325, 56, Elsevier Science Publishers B.V., Amsterdam, The Netherlands.

J.N. Keuler, L. Lorenzen, R.D. Sanderson, V. Prozesky and W.J. Przbylowicz, "Characterising Palladium-Silver and Palladium-Nickel Alloy Membranes Using SEM, XRD and PIXE", Nuclear Instruments and Methods in Physics Research, 1999, pp. 678-682, B 158, Elsevier Science B.V., Amsterdam, The Netherlands.

K.Y. Foo, "Chapter 4: Preparation and Characterization of a Composite Palladium-Gold Ceramic Membrane" and "Chapter 5: Conclusions and Recommendations", Hydrogen Separation in Palladium Ceramic Membranes and Palladium-Gold Ceramic Membranes, 1995, pp. 71-90, Colorado School of Mines, Golden, USA.

E. Kikuchi and S. Uemiya, "Preparation of Supported Thin Palladium-Silver Alloy Membranes and Their Characteristics for Hydrogen Separation", Gas Separation & Purification, 1991, pp. 261-266, 5, Butterworth-Heineman Ltd., USA.

V. Jayaraman, Y.S. Lin, M. Pakala and R.Y. Lin, "Fabrication of Ultrathin Metallic Membranes on Ceramic Supports by Sputter Deposition", Journal of Membrane Science, 1995, pp. 89-100, 99, Elsevier Science B.V., Amsterdam, The Netherlands.

G. Xomeritakis and Y.S. Lin, "Fabrication of Thin Metallic Membranes by MOCVD and Sputtering", Journal of Membrane Science, 1997, pp. 217-230, 133, Elsevier Science B.V., Amsterdam, The Netherlands.

B. McCool, G. Xomeritakis and Y.S. Lin, "Composition Control and Hydrogen Permeation Characteristics of Sputter Deposited Palladium-Silver Membranes", Journal of Membrane Science, 1999, pp. 67-76, 161, Elsevier Science B.V., Amsterdam, The Netherlands.

K.L. Yeung and A. Varma, "Novel Preparation Techniques for Thin Metal-Ceramic Composite membranes", AIChE Journal, Sep. 1995, pp. 2131-2139, 41-#9, American Institute of Chemical Engineers, New York, USA.

K.L. Yeung, J.M. Sebastian and A. Varma, "Novel Preparation of Pd/Vycor Composite Membranes", Catalysis Today, 1995, pp. 231-236, 25, Elsevier Science B.V., Amsterdam, The Netherlands.

J.P. Collins and J.D. Way, "Preparation and Characterization of a Composite Palladium-Ceramic Membrane", Industrial & Engineering Chemistry Research, 1993, pp. 3006-3013, 32-#12, American Chemical Society, Washington, DC, USA.

S.N. Paglieri, K.Y. Foo, J.D. Way, J.P. Collins and D.L. Harper-Nixon, "A New Preparation Technique for Pd/Alumina Membranes With Enhanced High-Temperature Stability", Industrial & Engineering Chemistry Research, 1999, pp. 1925-1936, 38-#5, American Chemical Society, Washington, DC, USA.

S.N. Paglieri, "Chapter 6: Preparation of Palladium-Copper Alloy Membranes for Hydrogen Separation" and "Chapter 7: Conclusions" and "Chapter 8: Recommendations for Future Work", Palladium and Palladium-Copper Composite Membranes for Hydrogen Separation, 1999, pp. 119-146, Colorado School of Mines, Golden, USA.

S. Aggarwal, A.P. Monga, S.R. Perusse, R. Ramesh, V. Ballarotto, E.D. Williams, B.R. Chalamala, Y. Wei and R.H. Reuss, "Spontaneous Ordering of Oxide Nanostructures", Science, Mar. 24, 2000, pp. 2235-2237, 287, The American Association for the Advancement of Science, USA.

T.B. Massalski, J.L. Murray, L.H. Bennett, H. Baker, L. Kacprzak, B.P. Burton, T. Weintraub and J. Bhansali (eds.), "Cu—Pd (Copper-Palladium)", Binary Alloy Phase Diagrams, 1990, pp. 947-948, vols. 1-3, ASM International, USA.

M. Kajiwara, S. Uemiya, T. Kojima and E. Kikuchi, "Hydrogen Permeation Properties Through Composite Membranes of Platinum Supported on Porous Alumina", Catalysis Today, 2000, pp. 65-73, 56, Elsevier Science B.V., Amsterdam, The Netherlands.

S. Thomas and M. Zalbowitz, Fuel Cells—Green Power, 1999, pp. 1-33, Los Alamos National Laboratory, Los Alamos, USA.

T. Koppeli and J. Reynolds, A Fuel Cell Primer: The Promise and the Pitfalls, Sep. 15, 2000. pp. 1-31, Rev. 4.

A. Criscuoli, A. Basile, E. Drioli and O. Loiacono, "An Economic Feasibility Study for Water Gas Shift Membrane Reactor", Journal of Membrane Science, 2001, pp. 21-27, 181, Elsevier Science B.V., Amsterdam, The Netherlands.

S. Roy, B.G. Cox, A.M. Adris and B.B. Pruden, "Economics and Simulation of Fluidized Bed Membrane Reforming", International Journal of Hydrogen Energy, 1998, pp. 745-752, 23-#9, Elsevier Science Ltd., Great Britain.

H.A. Benesi, R.M. Curtis and H.P. Studer, "Preparation of Highly Dispersed Catalytic Metals: Platinum Supported on Silica Gel", Journal of Catalysis, 1968, pp. 328-335, 10, Academic Press, London, United Kingdom.

U.S. Appl. No. 12/197,218, filed Aug. 22, 2008, Way, et al.

Amandusson, et al., "The effect of CO and $O_2$ on hydrogen permeation through a palladium membrane", Applied Surface Science, 2000, vol. 153, pp. 259-267.

Brey, et al., "Hydrogen as an energy carrier and its production by nuclear power", International Atomic Energy Agency, 1999, IAEA-TECDOC-1085, Vienna Austria, pp. 1-348.

Dolan, et al., Composition and operation of hydrogen-selective amorphous alloy membranes, Journal of Membrane Science, 2006, vol. 285, pp. 30-55.

Doyle, et al., "The Influence of intercystalline defects on hydrogen activity and transport in nickel", Acta Metallurgica et Materialia, 1995, vol. 43, No. 8, pp. 3027-3033.

Gade, et al., "Fabrication of Unsupported Palladium-Alloy Dfilms by Electroless Plating", Prepr. Pap.-Am. Chem. Soc., Div. Fuel Chem. 2007, vol. 52, No. 2, pp. 661-662.

Gade, et al., "Unsupported palladium allow foil membranes fabricated by electroless plating", Journal of Membrane Science, 2008, vol. 316, pp. 112-118.

Kueler, et al., "Characterization of electroless plated palladium-silver alloy membranes", Thin Solid Films, 1999, vol. 347, pp. 91-98.

Keuler, et al., "Developing a heating procedure to optimise hydrogen permeance through Pd—Ag membranes of thickness less than 2.2µm", Journal of Membrane Science, 2002, vol. 195, pp. 203-213.

Kajiwara, et al., "Stability and hydrogen permeation behavior of supported platinum membranes in presence of hydrogen sulfide", International Journal of Hydrogen Energy, 1999, vol. 24, p. 839-844.

Kulprathipanja, et al., Pd and Pd—Cu membranes: Inhibition of $h_2$ permeation by $H_2S$, Journal of Membrane Science, 2005, vol. 254, pp. 49-62.

Lemier, et al., "Grain boundary segregation, stress and stretch: Effects on hydrogen absorption in nanocrystalline palladium", Acta Materialia, 2007, vol. 55, pp. 1241-1254.

Li, et al, The effect of carbon monoxide and steam on the hydrogen permeability of a Pd/stainless steel membrane, Journal of Membrane Science, 2000, vol. 165, pp. 135-141.

Morreale, et al.,"The Permeability of Hydrogen in Bulk Palladium at Elevated Temperatures and Pressures", Journal of Membrane Science, 2003, vol. 212, pp. 87-97.

Paglieri, et al., "Innovations in palladium membrane research", Separations and Purification Methods, 2002, vol. 31, No. 1, pp. 1-169.

Di Pascasio, et al., "$H_2$ plasma for hydrogen loading in Pd", Intermetallics, 2003, vol. 11, pp. 1345-1354.

Zhang, et al., "High Temperature PEM Fuel Cells", Journal of Power Sources, 2006, vol. 160, pp. 872-891.

Official Action for European Application No. 03718215, dated Mar. 9, 2009.

Rodman et al. "Studies of the oxidation of palladium complexes by the advanced oxidation process pretreatment of model catalysts for precious metal analysis," Talanta, Sep. 15, 2006, vol. 70, No. 2, pp. 426-431.

Zhao et al. "Preparation of palladium composite membranes by modified electroless plating procedure," Journal of Membrane Science, May 13, 1998, vol. 142, No. 2, pp. 147-157.

Cheng et al., "Effects of electroless plating chemistry on the synthesis of palladium membranes," Journal of Membranes, 2001, vol. 182, pp. 195-203.

Official Action for European Patent Application No. 03718215.1, dated May 31, 2011. 4 pages.

* cited by examiner

FIG.15

| Solution | Constituent | Quantity |
|---|---|---|
| Pd Plating Bath | $PdCl_2$, 99.9% pure<br>$NH_4OH$<br>$Na_2EDTA$<br>$N_2H_4$ (1.0 M)<br>HCl | 5.45 g/L<br>389.6 mL/L<br>70 g/L<br>10 mL/L<br>10.9 mL/L |
| Cu Plating Bath | $CuSO_4$<br>$Na_2EDTA$<br>Formaldehyde (37%)<br>NaOH<br>Triton X-100<br>2,2-bipyridyl | 6.225 g/L $CuSO_4 \cdot 5H_2O$<br>20.0988 g/L<br>14.039 mL/L<br>20 g/L<br>25 mg/L<br>5 mg/L |

FIG.16

| Membrane No. | Type of support material | Support pore size (nm) | Estimated Thickness of Pd film | ⁻$N_2$ Flux $(mol/m^2s)$ × $10^4$ | Estimated Thickness of Cu film | *$N_2$ Flux $(mol/m^2s)$ × $10^4$ |
|---|---|---|---|---|---|---|
| 1 | Symmetric α-alumina | 200 | 47 | - | 10 | - |
| 2 | Symmetric α-alumina | 200 | 10 | 5.332 | 4 | 0.337 |
| 3 | Symmetric α-alumina | 200 | 6.5 | 1.073 | 4 | 0.105 |
| 4 | Symmetric α-alumina | 200 | 8 | 0.985 | 8 | 0.061 |
| 5 | Asymmetric zirconia | 50 | 8 | 0.438 | 6 | 0.021 |
| 6 | Asymmetric zirconia | 50 | 1.5 | 0.248 | 1 | 0.042 |
| 7 | Asymmetric γ-alumina | 5 | 10 | very high | - | - |

⁻ The membrane, coated with Pd, is pressurized with $N_2$ at 896.3 kPa. The time for the pressure to drop at 827.4 kPa is measured and the flux calculated.

* As above but now the membrane is coated with both Pd and Cu.

FIG.17

| Membrane No. | ΔP (kPa) | Heated to (K) | H₂ flux @ 500 °C (mol/m²s) | Highest Selectivity* | Thickness from SEM (μm) | Pd/Cu from EDAX (wt%) |
|---|---|---|---|---|---|---|
| 1 | 689.5 | 723 | 0.048 | 14 | 27.6 ±8.5 | 72/28 |
| 2 | 344.7 | 973 | 0.35 | 70 | 11.0±1.0 | 80/20 |
| 3 | 344.7 | 773 | 0.52 | 170 | 11.6±1.0 | 81/19 |
| 4 | 344.7 | 723 | 0.18§ | 270 | 12.5±1.5 | 78/22 |
| 5 | 344.7 | 723 | 0.80 | 1400 | 12±1.0 | 91/9 |
| 6 | 344.7 | 723 | 0.66# | 47 | 1.5 ±0.2 | 70/30 |

\* Selectivity = hydrogen flux/nitrogen flux.
§ Measurement made at 450 °C
Measurement made at 350 °C

FIG.18

| ITEM | COST ($) |
|---|---|
| Asymmetric ceramic support | 125 |
| Palladium | 17.5 |
| Other chemicals | 5 |
| Electricity and supplies | 0.2 |
| TOTAL | 147.7 |

PROCESS FOR PREPARING PALLADIUM ALLOY COMPOSITE MEMBRANES FOR USE IN HYDROGEN SEPARATION, PALLADIUM ALLOY COMPOSITE MEMBRANES AND PRODUCTS INCORPORATING OR MADE FROM THE MEMBRANES

CROSS REFERENCE TO RELATED APPLICATION

This application is a divisional of U.S. patent application Ser. No. 10/249,387, filed Apr. 3, 2003, now abandoned, which claims the benefit of priority under 35 U.S.C. §119(e) to U.S. Provisional Patent Application No. 60/369,674 filed Apr. 3, 2002.

FIELD OF THE INVENTION

The invention is directed to a process for fabricating a palladium alloy composite membranes, the composite membranes and products incorporating or made from such membranes.

BACKGROUND OF THE INVENTION

The hydrogen separating capability of Pd alloy membranes is well known. Applications include hydrogenation and dehydrogenation reactions and recovery of hydrogen from petrochemical plant streams. Other applications are high temperature hydrogen separations, fuel cell power systems, hydrogen fueling stations, hydrocarbon reforming, and use in membrane reactors, devices that can simultaneously form a product and separate the reaction products.

There are several patented Pd and Pd/Ag alloy membrane devices and fabrication processes. All of these devices are poisoned severely by the presence of sulfur compounds, typically $H_2S$, in a reducing environment. Solving the $H_2S$ poisoning problem is a necessity for application of metal membranes in the petroleum and petrochemical industries since all gas streams contain small amounts of $H_2S$ (0.01 to 1 ppm) which will poison metal membranes made from Pd and Pd/Ag alloys. The $H_2S$ poisoning problem will also be present for fuel cell power systems where hydrocarbons containing organic sulfur (such as gasoline, diesel fuel, and natural gas) are converted into synthesis gas.

Pd or Pd/Ag membrane materials useful for selectively separating hydrogen without poisoning the membrane have been actively pursued by the scientific community. A large base of technical literature exists specifically for Pd or Pd/Ag membranes and is the subject of numerous patents. Pd/Cu alloys and certain other Pd alloys are known to be much more resistant to $H_2S$ poisoning than Pd or Pd/Ag alloys.

There are two types of Pd and Pd alloy membranes. The first type is a Pd or Pd alloy foil membrane, a foil being a "free-standing" or unsupported membrane. The second type is a composite membrane that includes a substrate and a film of Pd or Pd—Ag that is supported on the substrate. With respect to the first type of membranes, McKinley is believed to have been the first to describe the beneficial properties of relatively thick palladium alloy foil membranes (25 to 100 microns in thickness). In U.S. Pat. No. 3,350,845, McKinley teaches the use of 0.1 mm thick (100 microns) Pd—Au alloy foil membranes for hydrogen separation which resist poisoning by sulfur compounds, including hydrogen sulfide. In U.S. Pat. No. 3,439,474, McKinley teaches the use of 25 micron thick 40 mass % Pd—Cu alloy foil membranes for the separation of hydrogen at elevated temperature and pressure. The primary benefits of the Pd—Cu alloy foil membrane include resistance to poisoning by $H_2S$ and higher hydrogen permeability compared to pure palladium.

With respect to the first type of membrane, U.S. Pat. No. 3,881,891 describes a method for increasing the hydrogen permeability of Pd alloy foil membranes and reducing the poisoning effects of sulfur compounds. The method involves adding water vapor to the gas mixture. They observed an increase in the hydrogen permeability in the presence of steam for all membranes tested. Exposure to water vapor also restored the hydrogen permeability of membranes previously exposed to $H_2S$.

Also relating to the first type of membrane, U.S. Pat. No. 6,103,028 describes methods for reducing the thickness of palladium alloy (Pd—Cu, Pd—Ag, Pd—Ru, and Pd—Y) foil membranes to increase the hydrogen flux. The foil membranes are annealed at 320° C. under hydrogen and then etched by exposure to mineral acids or by electrochemically removing metal from the membranes.

Further relating to the first type of membranes, U.S. Pat. No. 6,152,995 describes a process to increase the flux of hydrogen through a metal foil membrane by chemical etching using a mineral acid such as $HNO_3$ or mixtures of $HNO_3$ and HCl. This patent also describes methods for finding leaks on metal foil membranes and techniques to repair such leaks.

The second type of membranes is comprised of a thin film of Pd deposited on a substrate that could be dense or porous. In this regard, U.S. Pat. No. 5,149,420 discloses a method for forming a thin, micron thick layer of pure Pd on supports of dense Group IV-B and V-B metals such as niobium, vanadium, or tantalum, or titanium. In operation, the palladium layer catalyzes the dissociation of hydrogen molecules to hydrogen atoms, which can subsequently permeate through the Pd layer and the dense metal support layer. A Pd coating on the other side of the membrane allows for the recombination of hydrogen atoms to form molecular hydrogen. It should be noted that the primary source of diffusional resistance in such a membrane is due to the metal support layer.

Further relating to the second type of membranes, U.S. Pat. Nos. 5,451,386 and 5,652,020 teach the preparation of supported Pd membranes for hydrogen separation by electroless plating of a dense layer of Pd that is 10 to 20 microns thick on porous ceramic supports. In these membranes, the primary source of resistance to hydrogen diffusion is the Pd layer, not the ceramic support.

Apparently, Kikuchi and co-workers have fabricated Pd—Cu alloy films on porous supports by chemical deposition of Pd and then Cu with subsequent annealing (500° C. for 12 hours).

SUMMARY OF THE INVENTION

The invention is directed, at least in part, to a process for producing a composite membrane comprised of a substrate and a very thin Pd alloy film on the substrate. The ability to deposit a very thin Pd alloy film reduces the material cost of the film relative to membranes with thicker films and increases the $H_2$ flux since to a first approximation, the flux is inversely proportional to membrane thickness. In one embodiment, the film is less than about 1 micron.

In certain embodiments, the resulting membrane is comprised of a Pd alloy film that is both thin and resistant to sulfur poisoning. Such a membrane is useful in applications that require the separation of hydrogen from hydrocarbon streams that contain sulfur or sulfur compounds. One such application is in fuel cell power systems that use sulfur containing hydrocarbon fuels. In such system, the membrane separates $H_2$ from a product stream emanating from a fuel conversion reactor. In addition, at least in the case of a membrane with a Pd—Cu film, the membrane rejects carbon monoxide, a PEM fuel cell poison. Other applications for such a membrane include applications involving hydrogenation and dehydrogenation reactions, recovery of hydrogen from petrochemical plant streams, hydrocarbon reforming and coal gasification for power generation in fuel cells.

In one embodiment, the process comprises providing a porous substrate. Common porous substrates comprise ceramics, sintered metals, and sintered metals with ceramic outer surfaces. Typically, the size and shape of the substrate is dictated by the application. For instance, in a fuel cell application, the substrate is likely to be an open-ended cylinder or a block with multiple, parallel shafts or holes extending through the block.

If required, the porous substrate is pre-processed, i.e., subjected to one or more operations that place the substrate in condition for plating related operations and/or one or more operations that are more readily accomplished before plating related operations. For example, if needed, the substrate is cleaned so as to be substantially free of salts and other materials that would interfere with the plating operations. Further, the substrate is shaped to the extent needed. Typically, shaping involves cutting the substrate to desired dimensions. Additionally, if needed, surfaces of the substrate through which hydrogen is not to permeate are sealed. For example, in the case of a cylinder for use in a hydrogen filtering application, the Pd alloy film is established on the inner surface of the cylinder and the end surfaces of the cylinder are sealed. The sealing assures that the hydrogen from a hydrocarbon stream passing through the cylinder cannot follow a path between the inner wall of the cylinder and the end walls but must follow a path between the inner and outer surfaces of the cylinder so that the hydrogen passes though the outer wall.

After any pre-processing operations have been completed, the portion of the porous substrate that is to support the Pd alloy film is subjected to a number of plating related operations. Initially, the noted portion of the substrate is "seeded" with Pd crystallites that form nucleation sites for subsequent plating of a Pd film on the substrate. There are a number of methods for "seeding" the substrate. For example, impregnation with an organic solution of Pd acetate or Pd acetylacetonate is feasible. Another possible method is ion exchange.

After the substrate has been "seeded" with Pd crystallites, the substrate is plated with a Pd film. There are several electroless methods for accomplishing the plating, including osmotic plating, vacuum pump plating and batch plating. Electro-plating is also feasible.

After the substrate has been plated with the Pd film, a second ingredient of the alloy is plated on top of the Pd film. Among the possible second ingredients that will yield an alloy with sulfur resistance are copper and gold. The second ingredient is plated on top of the Pd film by dipping or flowing the second ingredient over the substrate and Pd film. An osmotic plating technique is also feasible. By appropriately controlling the thermodynamic conditions and/or times under which the Pd and second ingredient are plated onto the substrate weight percentages of the constituents of the film can be achieved. These percentages are typically chosen so as to produce a film that has a hydrogen flux at or near the maximum for the constituents of the alloy. For example, for a Pd—Cu film, the maximum hydrogen flux occurs with a 40% Cu. A 40% Cu can be achieved by conducting the Pd and Cu plating operations under substantially the same thermodynamic conditions and over periods of time that produce layers of Pd and Cu that are approximately equal in thickness.

After the second ingredient has been plated over the Pd film, the structure is annealed to produce a Pd alloy of substantially uniform composition. In one embodiment, annealing is accomplished by gradually heating the structure up to at least 350° but less than 600° C. in an inert gas atmosphere (e.g., He, Ar or Ne) for 12 hours and then switching the atmosphere to hydrogen. The annealing permits intermetallic diffusion of the second ingredient layer into the Pd layer, thereby forming the Pd alloy. The use of hydrogen gas allows the progress of the annealing to be monitored. To elaborate, when hydrogen flux reaches a steady state value, the annealing step is substantially complete. To produce a film thickness of 1 μm at the low end of the temperature scale, the annealing process takes at least 24 hours.

Once the Pd alloy film has been established on the substrate to produce the Pd alloy composite membrane, the membrane is subjected to air oxidation and reduction to improve the hydrogen flux of the membrane. In one embodiment, the membrane is subjected to air oxidation for a short duration (e.g., 5-30 minutes) at temperatures above 350° C., followed by exposure to hydrogen.

An advantage of the composite membrane approach is that membranes can be made by coating support materials to obtain a metal membrane typically thinner than most free-standing foil membranes.

BRIEF DESCRIPTION OF THE DRAWINGS

FIG. 15 is a table relating to Electroless Pd and Cu Plating Baths.

FIG. 16 is a table relating to Room Temperature Leak Testing of Pd—Cu Membranes FIG. 17 is a table relating to a summary of Pd—Cu Membrane Performances and Characterization.

FIG. 18 is a table relating to retail costs to make a 30 cm long section of 2 μm thick Pd—Cu membrane supported on an asymmetric ceramic ultrafilter.

DETAILED DESCRIPTION

Figure 1:
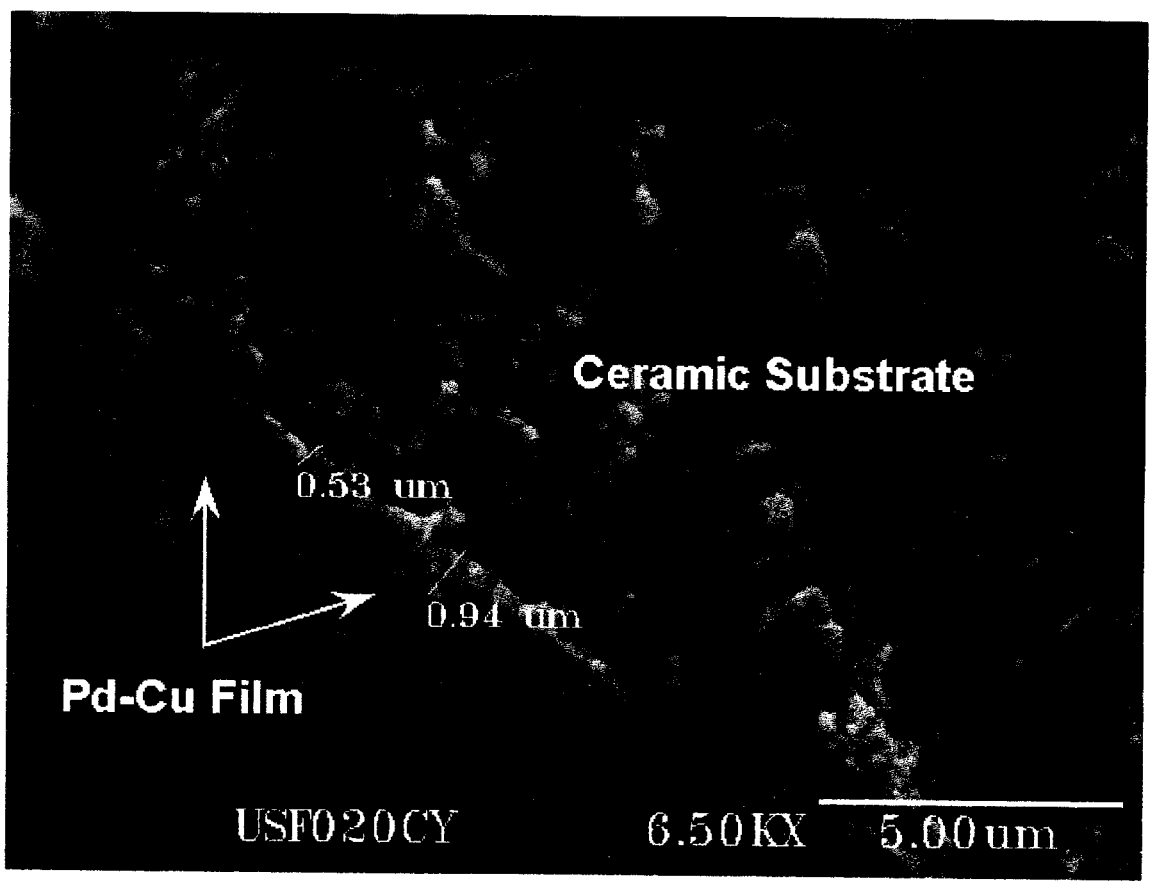
FIG. 1 is an SEM picture of the cross section of a Pd—Cu composite membrane (scale bar is 5 μm).

The invention is directed, at least in part, to a process for fabricating a composite membrane comprised of a substrate and a Pd alloy film supported on the substrate. Before describing the process, some of the characteristics of Pd alloys that render them preferable to pure or substantially pure Pd, at least in some applications, are described. To begin with, the critical temperature for existence of the β phase hydride is lower in Pd alloys than in pure or substantially pure Pd. This significantly reduces membrane rupture due to warping or cracking, a failure that affects pure or substantially pure Pd members in applications involving temperature cycling. Many Pd alloys are also more permeable to hydrogen than pure or substantially pure Pd, including $PdAg_{23}$, (compositions in wt. %), $PdCu_{40}$, $PdY_7$, and $PdRu_7$. Further, Pd alloys containing Au or Cu are more resistant to sulfur compounds than pure or substantially pure Pd. Ternary and higher alloys of Pd are capable of providing higher operating temperature capability relative to pure or substantially pure Pd.

The process for fabricating a Pd-alloy film on a tubular substrate is described for a $PdCu_{40}$ film. It should, however, be understood that the process is applicable to PdRu, PdAu, PdAg, PdNi, and PdFe and, in particular, $Pd_{93}Ru$, $Pd_{95}Au$, $Pd_{77}Ag$, $Pd_{93}Ni$ and $PdFe_7$, which are the compositions that are at or near the maximum hydrogen flux point for the alloy. The process is also applicable PdOs, PdCo, PdRh, PdIr and PdPt membranes. Generally, the process is applicable to alloys of Pd and elements other than Pd in Groups VIII and IB.

The use of the $PdCu_{40}$ alloy has a number of desirable characteristics. Namely, the hydrogen permeability of $PdCu_{40}$ passes through a maximum around 40 wt. % Cu. The high percentage of Cu significantly reduces membrane cost relative to pure Pd. Additionally, the $PdCu_{40}$ alloy exhibits increased resistance to $H_2S$. Further, a bcc alloy phase formed below 600° C. is believed to be responsible for an increased permeability of the $PdCu_{40}$ film compared to pure or substantially pure Pd. Like $PdAg_{23}$, $PdCu_{40}$ can withstand repeated temperature cycling with less distortion than pure Pd since at 40 wt. % Cu, the critical temperature for β-hydride phase formation is below room temperature.

Initially, a substrate is provided. Suitable substrates are made of oxide ceramics (e.g., alumina, titania and zirconia), non-oxide ceramics (e.g., SiC and SiN), sintered or porous metals (e.g., stainless steel and nickel), and sintered or porous metals with ceramic surfaces. The process is described with respect to a tubular substrate. However, the process is applicable to substrates of any geometry, provided the surfaces that are to bear the Pd—Cu film are adequately exposed. Further, presently, good results have been obtained with asymmetric substrates with a pore size gradient that extends over a 20-50 nm pore size range. Substrates that are not asymmetric, have pores of a different size, or have a different pore size gradient are also feasible.

If needed, the provided substrate is subjected to a pre-processing step in which the substrate is subjection to one or more operations that are needed to place the substrate in condition for plating related operations and/or one or more operations that more readily accomplished prior to plating related operations. If the substrate that is provided is not clean or becomes dirty before a plating operation, the substrate must be cleaned to remove any salts or other materials that could interfere with the subsequent plating processes. Typically, cleaning is carried out with isopropanol and deionized water but other cleaning procedures that remove the undesirable material or materials are also feasible.

Further, if the substrate that is provided does not have the appropriate dimensions, appropriate sizing operations are undertaken. Typically, this involves cutting the substrate but other form or shape altering methods are also feasible. It is also feasible to perform sizing operations at a different point in the process.

In addition, the surfaces of the substrate through which it is undesirable to have $H_2$ flow when the finished membrane is in use are sealed. Typically, a low temperature glaze (e.g., potter's glaze) is utilized because many substrates are subject to damage if exposed to high temperatures. For example, if the U.S. Filter T1-70 5 nm filter, an asymmetric ceramic filter, is exposed to temperatures above 600° C., the thin top layer of the filter is subject to damage. Regardless of the sealant utilized, the sealant is either painted onto the surface to be sealed or the surface is dipped in sealant. Other methods, such as spraying, are also feasible. In the described embodiment, the ends of the tubular substrate are each dipped into the sealant. With the ends sealed and assuming that the Pd alloy film is going to be applied to the inner wall of the substrate, $H_2$ and other materials that are in a stream that is passing through the tubular substrate are constrained to traveling through the Pd alloy film on the inner wall and then from the inner wall of the substrate to the outer wall of the substrate, which leads, in many applications, to some kind of collection manifold. Because of the sealant, the $H_2$ and other materials are prevented from exiting the substrate via the end walls, which do not, in many applications, lead to a collection manifold. It is also feasible to performing sealing operations at a different point in the process. For instance, in the case of a metal substrate, sealing by brazing, silver soldering or welding are feasible at any point in the process.

After pre-processing of the substrate, the surface of the substrate where the Pd—Cu film is to be deposited is "seeded" with Pd crystallites. This process can be performed using a variety of methods including impregnation with an organic solution of Pd acetate or Pd acetylacetonate. In one embodiment, the substrate is dip-coated for 3 minutes in a 0.05-0.2 M solution of Pd acetate in chloroform, dried, calcined at 400° C. and hydrotreated at 450° C. for 2 hours, followed by cooling under hydrogen. This particular embodiment is described in greater detail in a paper entitled, "A New Preparation Technique for Pd/Alumina Membranes with Enhanced High-Temperature Stability," Industrial & Chemical Engineering Research, 1999, 38, 1925-1936, which is incorporated herein by reference. Other Pd solutions can be applied to the substrate to "seed" the surface of the substrate. Further, following the application of whatever Pd solution is utilized, other processing steps and/or different sequences of steps are feasible for "seeding" the surface of the substrate on which the PdCu alloy film is to be deposited. Further, other methods, such as ion exchange are feasible for seeding the substrate. Regardless of the method employed, good adhesion of the "seeds" to the substrate is achieved by employing "seeds" that are smaller than the grains on the surface of the substrate that is being plated.

In the case of a metal substrate, the seeding of the surface with Pd crystallites is accomplished using an organic Pd solution in which the solvent is a light, polar, oxygenated organic solvent, such as tetrahydrofuran (THF), ethyl acetate, acetonitrile, diethyl ether, methyl ethyl keton (MEK), or acetone.

After the portion of the surface that is to bear the PdCu film has been seeded, a Pd film is deposited on the surface of the portion of the substrate that is to bear the PdCu film. In one embodiment, the Pd film is deposited using a flow system with an osmotic pressure gradient. A more detailed description of this plating procedure is in the paper entitled "Preparation and Characterization of Pd—Cu composite Membranes for Hydrogen Separation," substantially incorporated herein as an appendix. Other electroless plating systems, such as batch plating and vacuum pump plating, are also feasible. Further, electro-plating is also feasible.

After the portion of the substrate that is to bear the PdCu film has been plated with Pd, the portion of the substrate is plated with Cu. The Cu is plated onto the substrate using an electroless method, such as a dip or flow method. It is also feasible to use an osmotic plating method. Maximum hydrogen flux is achieved when the alloy is at or about 40 wt. % Cu. Given the densities of Pd and Cu, which are respectively about 12 g/cm$^3$ and 9 g/cm$^3$, an approximately 40 wt. % Cu alloy is achieved with layers of Pd and Cu that are approximately equal in thickness. One way to achieve Pd and Cu layers of approximately equal thickness is by performing the Pd and Cu plating operations under substantially the same thermodynamic conditions and for appropriate periods of time. It is also possible to perform the plating operations under different thermodynamic conditions and/or over different periods of time and achieve layers of substantially equal thickness. The maximum hydrogen flux for other Pd alloys is achieved with different weight percentages of constituents. Consequently, the conditions under which weight percentages are achieved that are at or near the weight percentages for maximum hydrogen flux are typically different than those for the PdCu alloy.

After the Pd and Cu have been plated onto the substrate, the structure is subjected to an annealing operation that is sufficient to achieve at least some intermetallic diffusion of the Cu layer into the Pd layer. In one embodiment, annealing is accomplished by slowly heating up the structure to at least 350° C. but less than 600° C. in inert gas atmosphere, such as He, Ar, or $N_2$, over a period of 12 hours and then switching the atmosphere to $H_2$. The annealing step permits intermetallic diffusion of the Cu layer into the Pd layer forming the alloy. Pd and Cu are miscible over the entire composition range. Annealing progress can be observed by measurement of the $H_2$ flux. When the flux reaches a steady-state value, the annealing process is complete. For thin, 1 μm films, this process will require about 24 hours at the lowest temperature.

Figure 2:
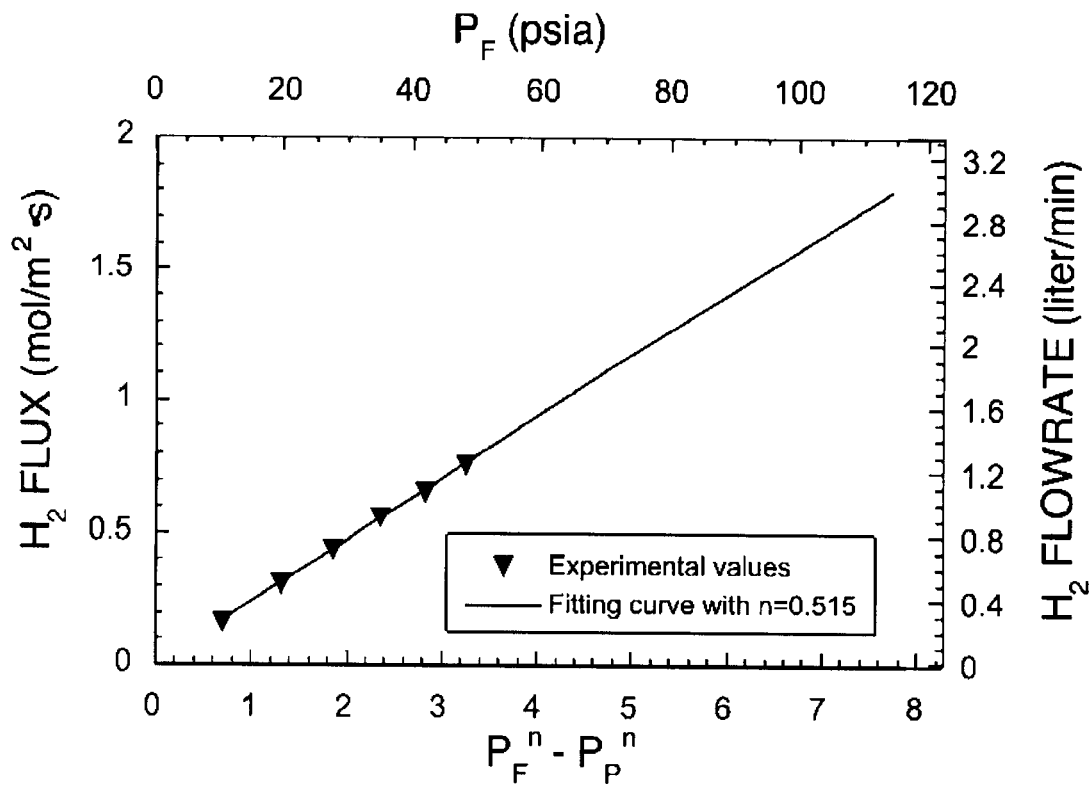
FIG. 2 shows the influence of $H_2$ feed pressure on the hydrogen flux through Pd—Cu membrane 25b. The experimental temperature is 350° C. The membrane composition is 60 mass % Pd, 40 mass % Cu.

At this point, the PdCu composite membrane is complete and useable in hydrogen separation applications that involve stream of hydrocarbons that include sulfur or sulfur compounds. Moreover, the PdCu film is 1 μm or less in thickness. Hydrogen flux data are shown in FIG. 2, for a nominal 3 μm $Pd_{60}Cu_{40}$ composite membrane. From FIG. 1, one obtains an $H_2$ flux of 240 ml/cm$^2$ min. expected for a feed pressure of 100 psig. The data points in FIG. 2 are at a temperature of 350° C.

Figure 3:
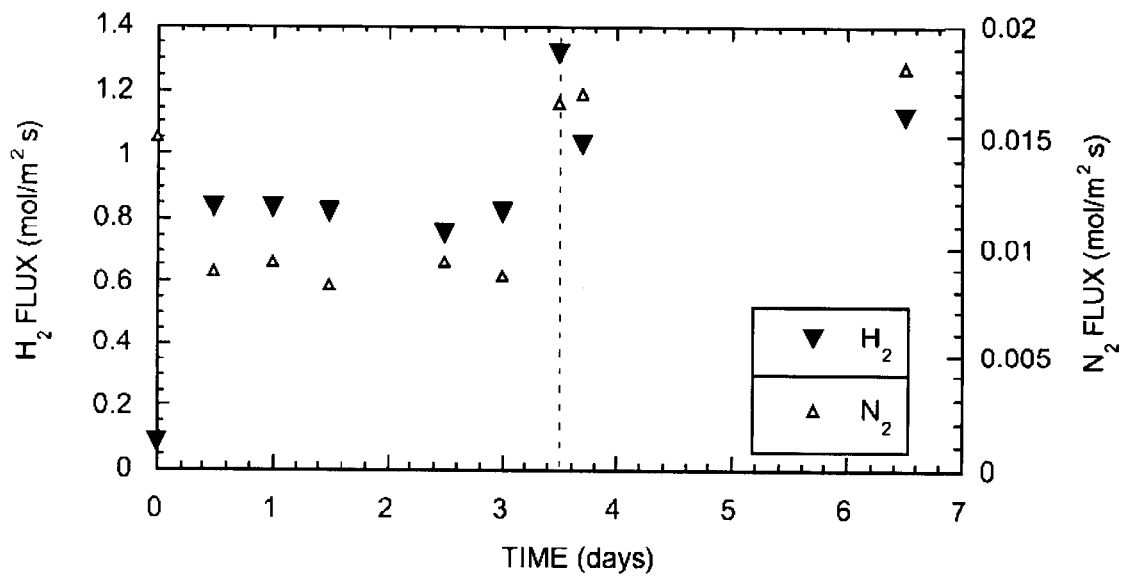
FIG. 3 shows flux data for Membrane #25b, 60 wt. % Pd. Film thickness ☐1.5 μm, temperature=350° C. The pressure differential for the permeation tests was 225 kPa. Note the flux increase due to the "air purge" treatment, shown as a dotted line.

A further step has been found to increase the hydrogen flux of the membrane. Namely, the composite membrane is subjected to air oxidation and reduction to activate the metal surface. This step is believed to "roughen" the surface of the film, and thereby increase the surface area of the film. The increased surface area is believed to provide the greater hydrogen flux. The increased surface is believed to be responsible for the greater hydrogen flux. In one embodiment, a short duration (5 to 30 minutes) air oxidation at temperatures above 350° C. followed by exposure to $H_2$ and subsequent reduction. With reference to FIG. 3, an "air purge" at 3.5 days caused a sharp increase in hydrogen flux from 0.81 mol/m$^2$s to 1.32 mol/m$^2$s. The flux decreased to a new steady-state value of 1.07 mol/m$^2$s, 32% higher than the flux before the air purge treatment. Rather than air reduction and oxidation, the composite membrane can be subjected to $O_2$, $O_3$, acids, steam, $SO_2$, or a combination of $H_2S$/steam to disturb the surface of the palladium alloy film.

Typical applications are high temperature hydrogen separations, fuel cell power systems, hydrogen fueling stations, hydrocarbon reforming, and use in membrane reactors, devices that can simultaneously form a product and separate the reaction products. For example, in the case of a fuel cell, the membrane is part of the fuel processor reformer. In membrane reactors, the membrane forms at least a wall of the reactor. In the case of a hydrogen fueling station, the membrane is part of the fuel processor or reformer.

APPENDIX

Pd—Cu composite membranes were made by successive electroless deposition of Pd and then Cu onto various tubular porous ceramic supports. Ceramic filters used as supports included symmetric α-alumina (nominal 200 nm in pore size), asymmetric zirconia on α-alumina (nominal 50 nm pore size), and asymmetric γ-alumina on α-alumina (nominal 5 nm pore size). The resulting metal/ceramic composite membranes were heat-treated between 350° C. and 700° C. for times ranging from 6 to 25 days to induce intermetallic diffusion and obtain homogeneous metal films. Pure gas permeability tests were conducted using hydrogen and nitrogen. For a 11 μm thick, 10 wt. % Cu film on a nominal 50 nm pore size asymmetric ultrafilter with zirconia top layer, the flux at 450° C. and 345 kPa $H_2$ feed pressure was 0.8 mol/m$^2$·s. The ideal hydrogen/nitrogen separation factor was 1150 at the same conditions. The thickness of the metallic film was progressively decreased from 28 μm down to 1-2 μm and the alloy concentration was increased to 30 wt. % Cu.

Structural factors related to the ceramic support and the metallic film chemical composition are shown to be responsible for the differences in membrane performance. Among the former are the support pore size, which controls the required metal film thickness to insure a leak free membrane and the internal structure of the support (symmetric or asymmetric) which changes the mass transfer resistance. The support with the 200 nm pores required more Pd to plug the pores than the asymmetric membranes with smaller pore sizes, as was expected. However, leak free films could not be deposited on the support with the smallest pore size (5 nm γ-alumina), presumably due to surface defects and/or a lack of adhesion between the metal film and the membrane surface.

INTRODUCTION

The hydrogen separating capability of Pd alloy membranes is well known. Applications include hydrogenation and dehydrogenation reactions [1] and recovery of hydrogen from petrochemical plant streams [2]. Recently there has been interest in utilization of Pd membranes to separate hydrogen produced in hydrocarbon reforming and coal gasification for power generation in fuel cells. Such applications have the potential to reduce energy consumption, capital costs or the number of unit operations compared to conventional systems. To consume less Pd, thin films or foils of Pd on the order of microns in thickness are applied to porous substrates for mechanical strength. Porous glass, ceramic, stainless steel, and polymers are common supports [3]. Hydrogen permeable metals such as tantalum (Ta) with a Pd coating also function as effective hydrogen separators [2, 4].

Some very thin, permeable and permselective Pd composite membranes have been prepared by various research groups, although several hurdles inhibit commercial implementation of Pd membrane technology [5-7]. These problems include embrittlement and cracking due to the $\alpha \rightarrow \beta$ Pd hydride phase transition, which occurs during temperature cycling [8] and poisoning or fouling due to the presence of sulfur or unsaturated carbon compounds in the operating stream [9-11]. Also, in order to be accepted by industry, membranes must have a lifecycle on the order of years under process conditions [12].

Alloys of Pd possess properties that may alleviate some of the shortcomings of pure Pd [13]. To begin with, the critical temperature for existence of the $\beta$ phase hydride is lowered in alloys. This helps eliminate membrane rupture due to warping or cracking, a failure associated with temperature cycling. Many alloys are also more permeable to hydrogen than pure Pd including $PdAg_{23}$[14] (compositions in wt. %), $PdCu_{40}$ [15], $PdY_7$[16, 17] and $PdRu_7$[18]. Alloys containing Au or Cu are more resistant to sulfur compounds [19, 20]. Ternary and higher alloys of Pd have been developed to impart high temperature operating capability [21].

The hydrogen permeability of Pd—Cu passes through a maximum around 40 wt. % Cu significantly reducing membrane cost (relative to pure Pd), and this alloy exhibits increased resistance to $H_2S$ [19, 22-27]. Additionally, a bcc alloy phase formed below 600° C. is credited with the increased permeability compared to pure Pd [26, 28, 29]. Like $PdAg_{23}$, $PdCu_{40}$ can withstand repeated temperature cycling with less distortion than pure Pd since at 40 wt. % Cu, the critical temperature for $\beta$-hydride phase formation is below room temperature [15, 30-32].

Preparation of Pd alloys has been accomplished in the past by casting and rolling or induction melting followed by cold working into a foil or tube [33-35]. Composite Pd alloy membranes have been fabricated by sputtering, CVD, electroplating, and electroless plating. Much recent work has involved the use of electroless plating to make Pd—Ag [36-39], Pd—Ni [40] and Pd—Au alloy membranes [41].

Pd—Ag alloy films have been fabricated by several research groups using sequential metal deposition followed by annealing [39, 42, 43]. To obtain a homogeneous alloy film from two distinct metal layers in a reasonable amount of time, a high enough temperature must be utilized to promote complete intermetallic diffusion [38]. Shu et al. annealed a codeposited Pd—Ag film for 150 minutes at 400° C. and a sequentially deposited Pd—Ag film for 5 hours at 700° C. [37], while Kikuchi annealed a sequentially deposited Pd—Cu film between 300 and 540° C. [39]. Kikuchi and Uemiya deposited Pd—Ag alloy films by sequential electroless plating, followed by heat treatment at temperatures of 800-1300° C. [44]. Uemiya et al. found that Pd—Ag films deposited by sequential electroless deposition require high temperatures (>800° C.) to produce a homogeneous film [38]. Sakai et al., and Kawae et al. annealed Pd—Ag at 900° C. for 2, and 12 hours respectively [43, 45].

Lin and coworkers have deposited Pd—Ag films onto asymmetric $\gamma$-alumina supports (3 nm pores) using magnetron sputtering [46-48]. A membrane with a 177 nm $PdAg_{18}$ film exhibited hydrogen/helium perm-selectivity of 3845 at 300° C. [48]. An observation they made was that the beginning surface roughness of the support was a critical parameter in obtaining a defect free and adherent membrane [46].

Deposition under an osmotic pressure gradient by conducting electroless plating with a more concentrated solution on the opposite side of the porous support has been found to produce thinner Pd films that are more impenetrable to permeation of gases other than hydrogen [49, 50]. Several desirable features of applying this technique to the manufacture of the Pd/Cu membranes include smaller grain-size, reduction in porosity, surface homogeneity and densification of the plated film.

Most Pd—Cu alloy membrane work has been carried out using foils [15, 17, 26, 51]. Apparently, the only group to previously fabricate Pd—Cu alloy films on porous supports by electroless deposition of Pd and then Cu with subsequent annealing (500° C. for 12 hours) was Kikuchi and coworkers [38, 39]. The objective of the present work was to fabricate a thin and hydrogen selective Pd—Cu composite membrane in a similar fashion while reducing the thickness of the metal film. Three different types of tubular, porous ceramic membranes with progressively smaller pore sizes were used as supports for the thin Pd—Cu films. The effect of film thickness and composition on annealing conditions and hydrogen permeability was also investigated.

EXPERIMENTAL SECTION

Support Specifications

Figure 4:
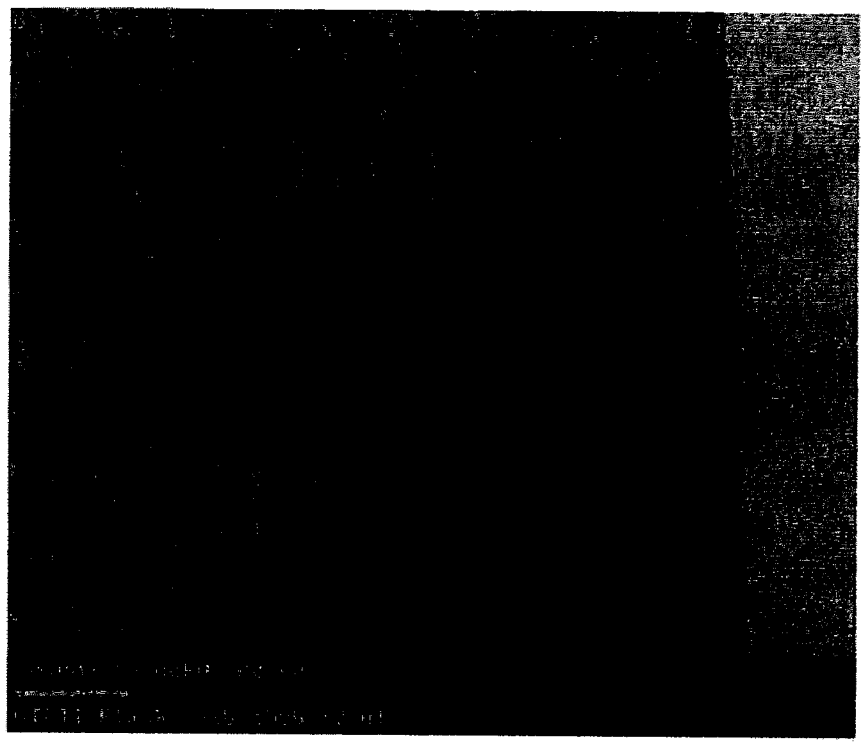
FIG. 4 is a cross-section of symmetric, α-alumina GTC 998 support with a nominal 0.2 μm pore size. Scalebar is 50 μm.
Figure 5:
FIG. 5 is a cross-section of an asymmetric, alumina ultra-filter. Scalebar is 50 μm.

Tubular, porous alumina microfilters with nominal 0.2 μm pore size, were procured from Golden Technologies Company (GTC, Golden, Colo. now Coors Tech Oak Ridge, Oak Ridge, Tenn.). Designated GTC998, these tubes have an OD of 9 mm, an ID of 6.1 mm, and are fabricated from 99.8% pure $\alpha$-alumina. FIG. 4 is a Scanning Electron Microscope (SEM) image of the GTC998 cross section. Asymmetric ceramic membranes consisting of a sol-gel zirconia selective layer on top of several porous support layers composed of $\alpha$-alumina particles were also used. The other asymmetric membranes used in this work had nominal 5 nm pore size with a $\gamma$-alumina selective layer coated on top of the two layers with pore sizes of 0.4 and 0.2 μm ($\alpha$-alumina) on the same type of macroporous support. A scanning electron micrograph of the cross-section of a typical asymmetric alumina membrane is shown in FIG. 5.

Substrate Preparation

The detailed procedure for substrate preparation has been given elsewhere [52, 53]. Selected support tubes were cut to length with a diamond saw, sequentially cleaned and rinsed ultrasonically in solutions of Alconox detergent, acetic acid, hot water, and 2-propanol [52]. After cleaning, the ends of the ceramic tubes were sealed with a high temperature glaze.

Surface Activation

The surface activation step has been described in detail by Paglieri et al. [53]. Briefly, the support tube was dip-coated for 3 minutes in a 0.05-0.2 M solution of Pd acetate in chloroform, dried, calcined at 400° C. and hydrotreated at 450° C. for 2 h, followed by cooling under hydrogen.

Metal Film Deposition

The plating methodology to produce a Pd—Cu alloy film has been described in detail by Paglieri [54]. In summary, the preparation of a Pd—Cu alloy membrane film can be divided into two distinct steps, electroless plating of Pd and Cu followed by high temperature annealing in flowing $H_2$. First, layers of Pd and Cu were sequentially deposited by electroless plating on activated porous substrates. The plating time and gravimetric analysis were used to approximately determine the final alloy composition. The electroless palladium and copper plating bath recipes are reported in FIG. 15. It was found that electroless plating of Cu onto a Pd/alumina composite membrane was necessary because otherwise the electroless Pd solution replaced Cu by displacement plating. The plating bath temperature was controlled to 65±5° C. in a water bath. Plating cycle time was adjusted to achieve the desired Pd-layer thickness. After plating, the membranes were rinsed, soaked for several hours to overnight in 70° C. water (to remove plating solution and other impurities), rinsed, dried in air at 80° C., and weighed. The Pd film thickness was estimated by dividing the weight difference between the plated and unplated membrane by the plated surface area and density of Pd (11.96 g/cm$^3$). Scanning electron microscopy was also used to determine film thickness following permeation measurements. Finally, the composite membrane was annealed above 350° C. in hydrogen to form a homogeneous alloy.

High Temperature Testing Procedures

Gas permeation experiments began with a room temperature leak test conducted with nitrogen, followed by high temperature gas permeation experiments conducted with hydrogen and nitrogen. The room temperature leak test was conducted in the following manner: the membranes were sealed into stainless steel compression fittings with graphite ferrules, the lumen was pressurized with nitrogen at 896 kPa and submerged in an alcohol/water mixture. The time for the pressure to drop to 827 kPa was measured and an unsteady state mass balance was solved to yield the room temperature nitrogen flux through the membrane:

$$J_{N_2} = \frac{D_m x_{Pd-Cu}}{4RTt} \ln\left[\frac{P_1 - P_0}{P_2 - P_0}\right] \quad (1)$$

Where $J_{N_2}$ is the nitrogen leak flux, Dm is the internal tube diameter, $x_{Pd-Cu}$ is the thickness of the metal film, R the universal gas constant, T the temperature, $P_1$ the initial pressure, $P_2$ the final pressure, $P_0$ the atmospheric pressure and t the time for the pressure to drop from $P_1$ to $P_2$. Calculated $N_2$ fluxes are reported in FIG. 16.

Following the leak test, permeation tests were performed at high temperature. The membrane was loaded into a stainless steel shell and centered in a tube furnace. The permeation module design is described in detail in a prior publication [52]. Single gas permeability tests were conducted at transmembrane pressure differentials of either 345 kPa or 690 kPa using either hydrogen or nitrogen up to 650° C. Brooks mass flow controllers metered gas flow or it was controlled manually with a needle valve. All gases were nominally 99.999% pure (UHP grade) and were used without further purification. Permeate pressure (shell side) was local atmospheric pressure (~83 kPa). No sweep gas was used on the permeate side during the single-gas permeation experiments. Gas flow rates were measured using bubble flowmeters. These values were converted to STP and pure gas fluxes were calculated. The sweep side was purged with helium after testing with hydrogen, otherwise back-permeation of hydrogen to the tube side through the membrane resulted in a negative flux for a period of time.

The membrane was heated (and cooled) at 1° C./min. under helium purge. To avoid embrittlement of the pure Pd films hydrogen was not introduced until 350° C., well above the critical temperature for the α→β phase transition [13] for pure Pd. In some instances, while conducting the permeability tests, the membranes were exposed to flowing air at 275 kPa for 30 minutes. This procedure seems to enhance the hydrogen permeation through rearrangement of the metal surface [55].

Upon completion of high temperature permeability tests, the membrane was cooled at 1° C./min. under inert gas. Final measurements of inert gas flux through the membrane were then made at room temperature. After removal of the membrane from the permeation apparatus, it was visually inspected to determine if leaks originated from the membrane or the fittings by performing another ambient temperature leak test under isopropanol/water.

Membrane Characterization

The tested membranes were frozen in liquid nitrogen and then fractured into small pieces, acceptable for instrumental analysis. Scanning electron microscopy (SEM—JEOL 840) was used to study film morphology and estimate Pd film thickness. Specimens were prepared by attaching pieces of broken membrane to metal buttons with carbon paint or tape. The samples were coated with gold (thickness of gold coating ~500 μm) to make them more conductive. Then the film morphology was observed by scanning over large portions of the film surface and cross-section at both low and high magnifications. Metal film thicknesses were obtained by averaging measurements made from several micrographs taken at different locations perpendicular to the cross section.

Pd—Cu alloy structure and domain orientation were examined by X-ray diffraction (XRD—Rigaku RU—200). Metal films were first peeled off from the ceramic substrate and then mounted on glass slides using double-sided tape. Scanning was typically conducted over the angular range from 20 to 90° 2θ. Energy-dispersive X-ray analysis (EDAX—Noran 5500) was used for elemental analysis. Samples were prepared the same as those for SEM but coated with carbon instead of gold for elemental analysis.

Results and Discussion

Annealing

The objective of this part of the work was to prove that alloys of Pd and Cu could be prepared in-situ by heating successively electrolessly deposited layers of each metal. The literature provides wide support to this hypothesis [27, 38, 39]. From the Pd—Cu phase diagram, Pd and Cu are miscible over the entire range of compositions, so their intermixing should take place with relative ease [56].

Figure 6A:
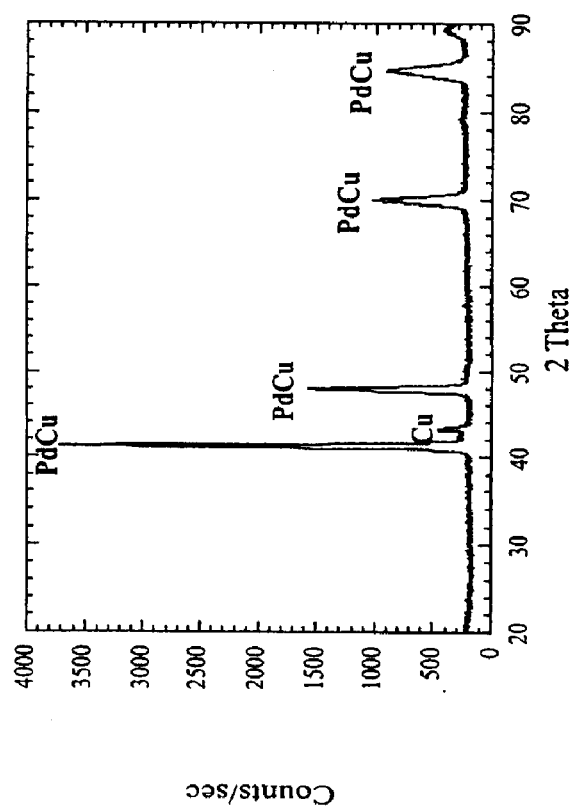
FIG. 6 shows XRD results for the annealing of GTC Pd/Cu membrane. Film thickness≅22 μm (a) As electrolessly deposited. (b) Annealed at 600° C. for 12 hours under helium.
Figure 6B:
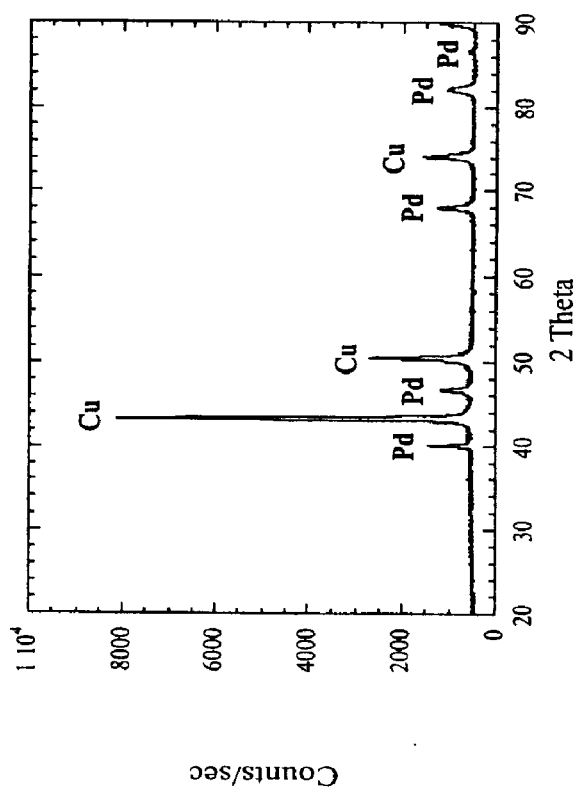
Figure 9A:
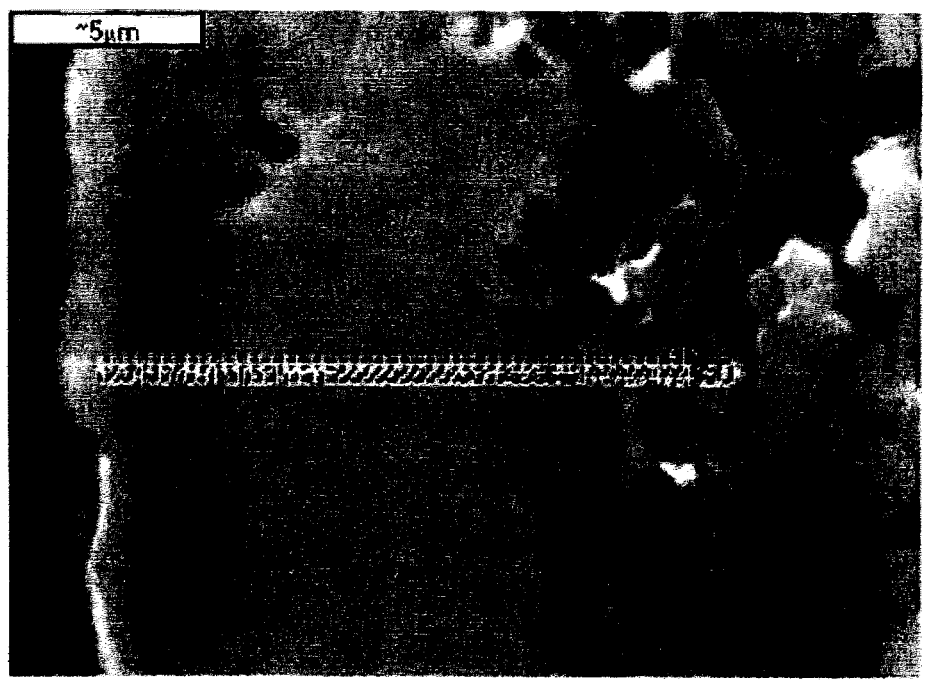
FIG. 9 is a scanning electron micrograph (a) and EDAX analysis profile (b) for Membrane 3. The crosses through the SEM image show the location of the individual EDAX analyses. Location 0 corresponds to the Pd—Cu membrane top surface and 50 corresponds to a point approximately 5 μm into the alumina support.
Figure 9B:
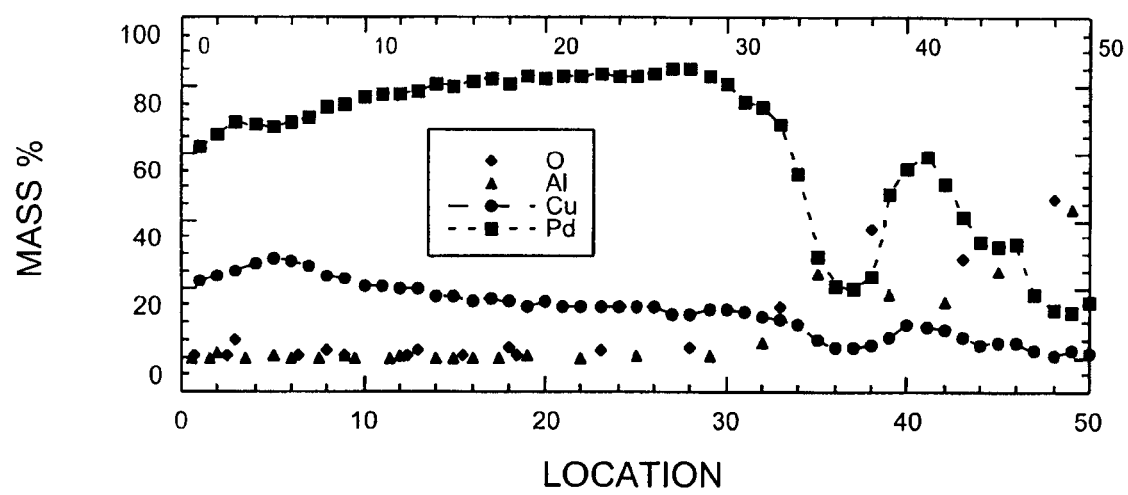
Figure 11A:
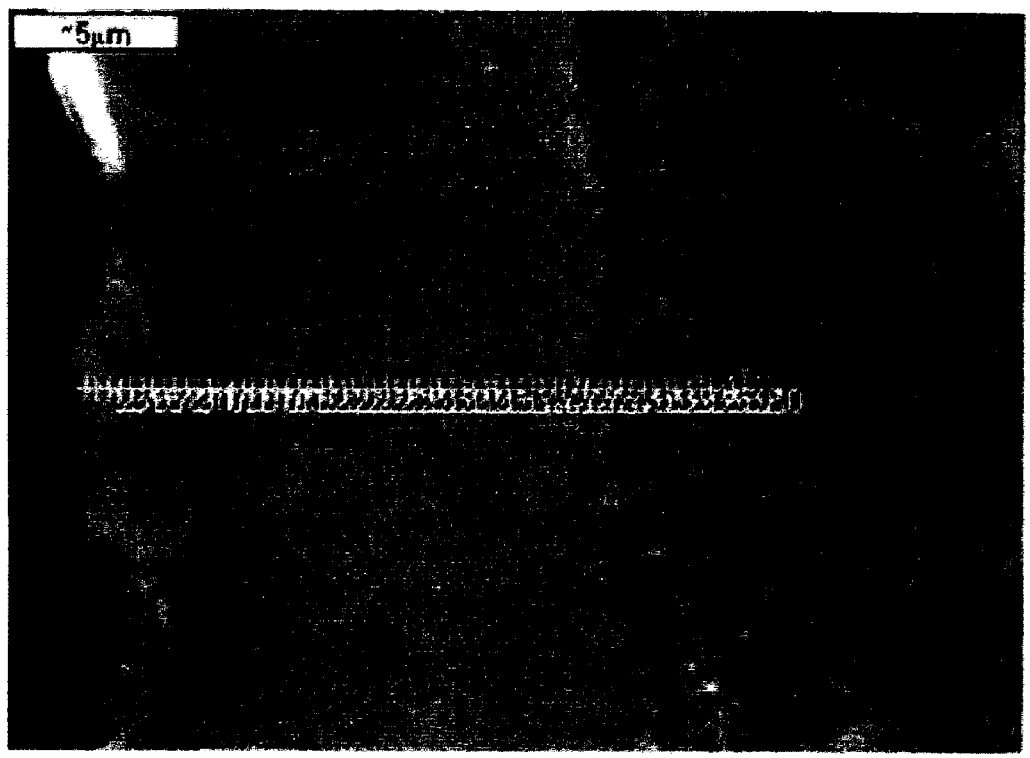
FIG. 11 is a scanning electron micrograph (a) and EDAX analysis profile (b) for Membrane 5. The crosses through the SEM image show the location of the individual EDAX analyses. Location 0 corresponds to the Pd—Cu membrane top surface and 50 corresponds to a point approximately 5 μm into the alumina support.
Figure 11B:
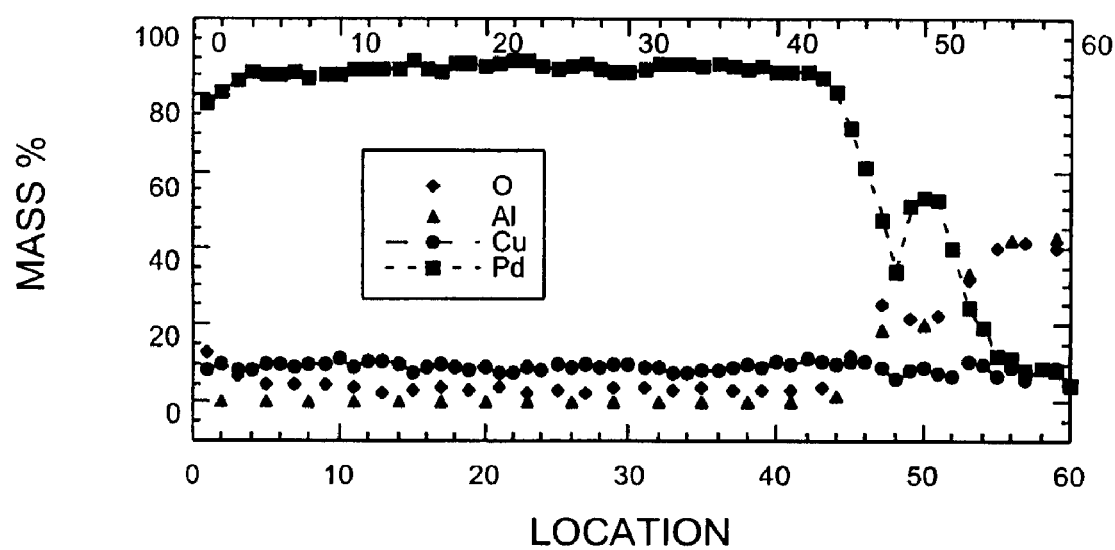

Small pieces of GTC Pd/Cu Membrane were heated to 600° C. for 12 hours under helium and analyzed afterwards with XRD to determine if a homogeneous film was created. The XRD analysis of the metal films (FIG. 6) demonstrated that an alloy membrane was formed upon heat treatment at 600° C. in comparison to the unheated sample. Small amounts of non-annealed copper are still observed; however, additional annealing is accomplished during $H_2$ permeation testing. EDAX analysis of membranes after testing has always shown uniform Cu and Pd concentration profiles as shown in FIGS. 9b and 11b below. Those results demonstrated the potential for Pd—Cu membranes to be prepared by sequential electroless deposition followed by "in-situ" annealing at high temperature. Subsequent membranes were all heat-treated while carrying out the hydrogen transport measurements at the same time.

Influence of Supports

Two important structural factors were considered in selecting the supports: pore size and symmetry. Their influence on the membrane performance is fundamental in establishing an understanding of how the support affects membrane fabrication and performance. These include the minimum thickness of a leak free metal film and the overall mass transfer resistance. Regarding the former, our conjecture was that a support having a smother surface (small pore size) would require a thinner film of metal to be leak free. For the second, our proposition was that asymmetric supports when combined with the metal film should present less resistance to the hydrogen flux than symmetric tubes.

In order to address these hypotheses, different types of supports with varied structural features were used to make the Pd—Cu composite membranes, which were later annealed and tested according to the procedure described before. FIG. 17 presents the high temperature gas permeation results for all the membranes tested.

Symmetric Supports

Initial experiments were performed using symmetric $\alpha$-$Al_2O_3$ tubes, 200 nm in pore size. Early trials using these supports suggested that palladium deposition alone was sufficient to plug the pores. For instance, when a leaking Pd-coated tube was plated with copper, it routinely continued leaking. In general, palladium plating times of several hours were required for these symmetric tubes before leak-free membranes were obtained. Consequently, thicker layers of metal were deposited in comparison with the asymmetric tubes as shown in FIG. 16. This behavior indicates that the pore size basically controls how thick the metal film has to be to guarantee a low leakage rate.

Figure 7:
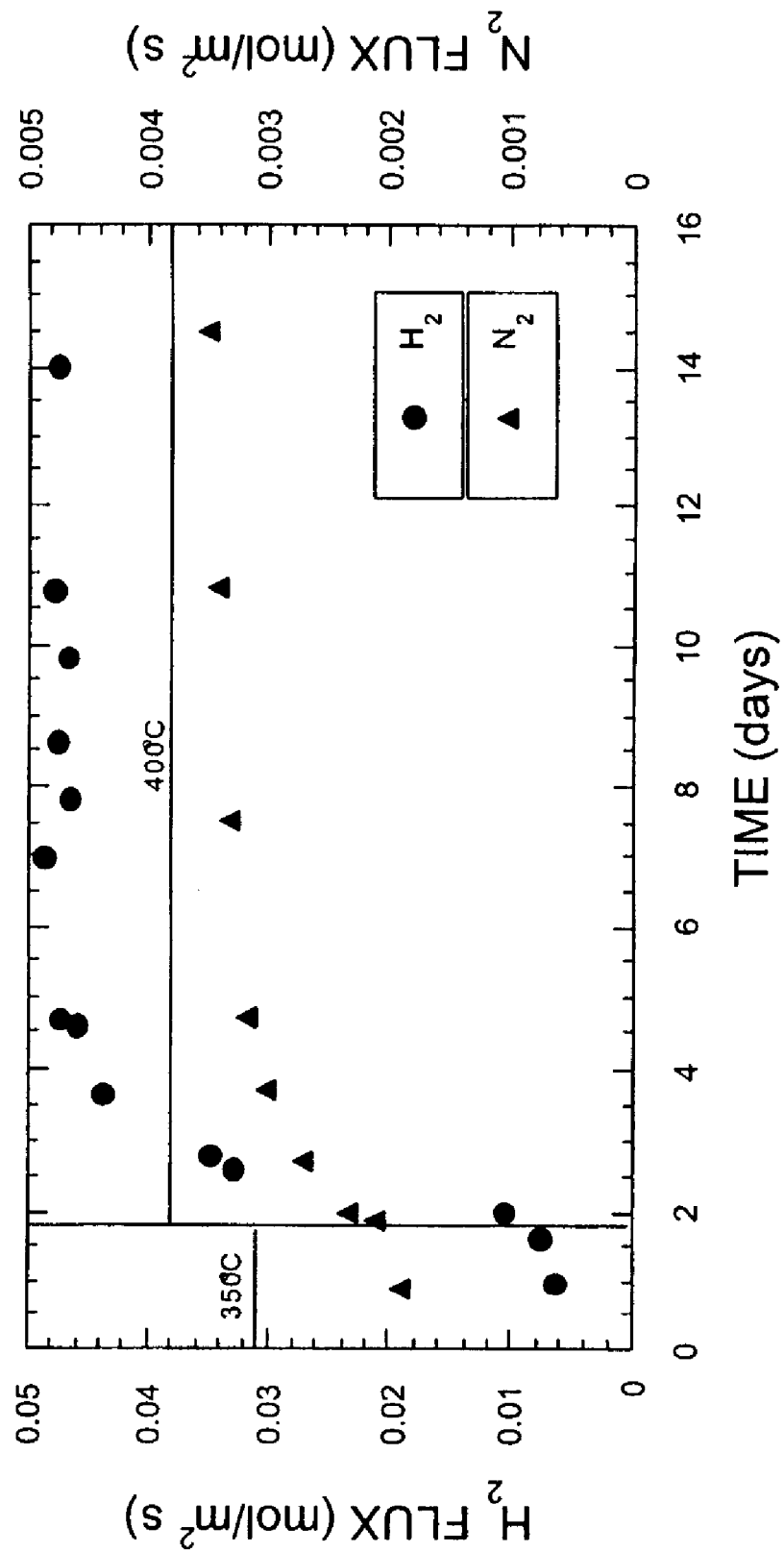
FIG. 7 shows flux data for Membrane 1. Film thickness≅28 μm. The pressure differential for permeation tests was 690 kPa.

FIG. 7 presents the high temperature permeation test results for membrane 1. With a thickness close to 30 μm, this membrane produced a maximum ideal separation factor $H_2/N_2$ of 14 and a hydrogen flux of roughly 0.05 mol/m²s. An XRD analysis on that membrane revealed the formation of a Pd—Cu alloy containing 24 wt. % copper [54].

Figure 8:
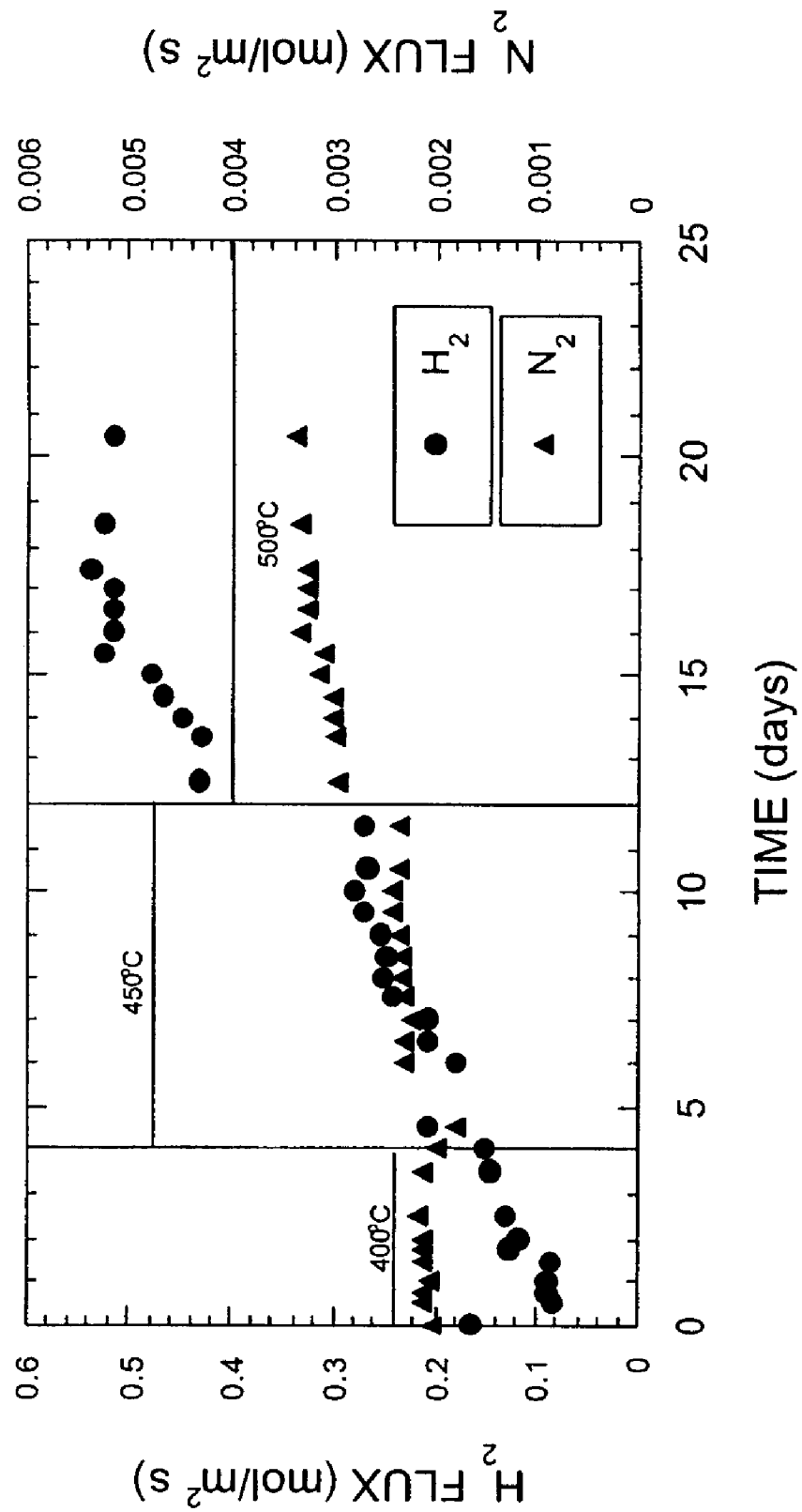
FIG. 8 shows flux data for Membrane 3. Film thickness≅11 μm. The pressure differential for permeation tests was 345 kPa.

Using the same kind of support, three more membranes were fabricated reducing the palladium plating time to determine the minimum metal film thickness required. In FIG. 17, details for membranes 2, 3 and 4 are presented. Membrane 3 was chosen as most representative for those three. FIG. 8 represents the high temperature permeation test for this membrane; FIG. 9 shows a detailed SEM section of the metal layer upon which EDAX elemental analysis was carried out.

Clearly, improvements in the separation factor and the hydrogen flux through the membrane were achieved. As seen in FIG. 17, an average separation factor of 170 and a $H_2$ flux of over 8 an a half times that for membrane 1 were obtained using just one third of the thickness in the latter. The EDAX concentration plot indicates the presence of copper throughout the palladium film but at slightly higher concentration close to the gas-metal interface. Similar EDAX patterns were obtained for membranes 2 and 4, proving that alloying 'in situ' had worked as proposed and the Cu composition profile was essentially uniform.

The increase in the separation factor can be attributed to the fine tuning of plating parameters including bath temperature, flow rates and overall hydrodynamics of the plating set up. These allowed more stable and homogeneous plating, which in turn created a more impervious film. On the other hand, smaller metal film thicknesses, a result of less plating time, were the cause of higher hydrogen fluxes since the metal layer provides the major mass transfer resistance [7, 57]. However, an acceptably low nitrogen leakage rate could not be obtained for any of these membranes if the thickness was less than about 11 microns. As pointed out before, to further decrease the thickness of the metal film, a support having smaller pore size in the top layer (less surface roughness) had to be used.

Asymmetric Supports

Membranes 5 and 6 were made using an asymmetric support, whose selective porous top layer was 50 nm in pore size. We hypothesized that the thickness of metal layer needed to make a leak free membrane on these supports should be greatly diminished. In general, this strategy was confirmed and successful in achieving better membrane performance as seen in FIG. 17.

Figure 10:
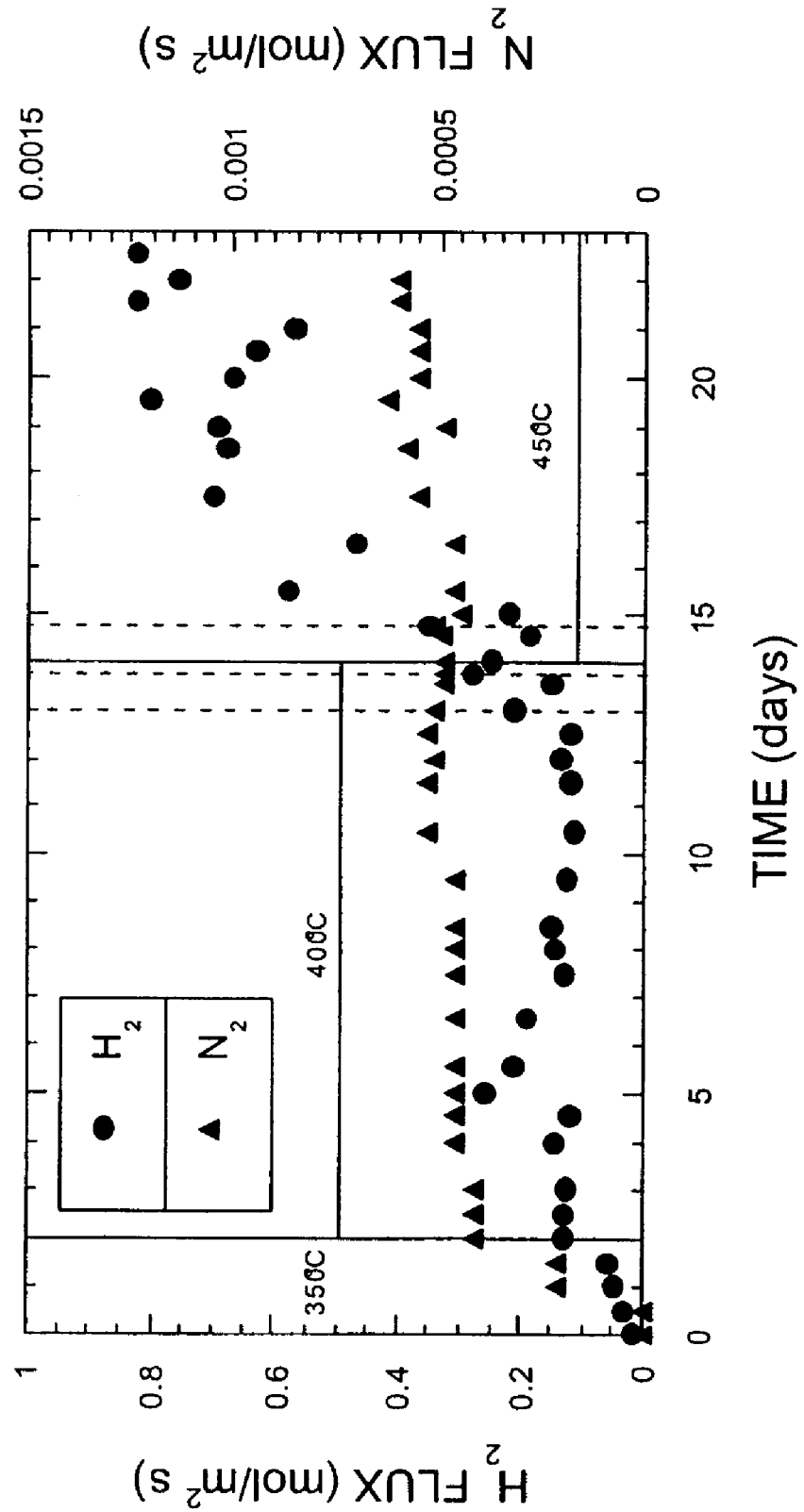
FIG. 10 shows flux data for membrane 5. Metal layer thickness≅10 μm. The pressure differential for permeation tests was 345 kPa. Dotted lines represent 30 minute air purges.

Membrane 5, in particular, exhibited very high separation factor and hydrogen flux in spite of having about the same thickness as membranes 3 and 4. FIG. 10 shows the high temperature permeation experiments and FIG. 11 the membrane's EDAX quantitative elemental analysis with respective SEM detail. A very homogeneous Pd—Cu film can be observed, containing about 10% Cu.

The improved performance of membrane 5 relative to membrane 3 could be due to the change in support structure or the difference in Cu composition of the metal film. The support structure changes include both a reduction in particle size cut-off (0.2 μm to 0.05 μm) and the use of an asymmetric support having lower resistance to flow. Both the support internal structure and the top layer pore size play fundamental roles in the membrane performance.

The asymmetric supports concentrate the mass transfer resistance in the top selective layer upon which the metal layer is deposited. This selective layer is very thin (less than 1% of the total wall thickness) as can be observed in FIG. 5. The inner layers are formed of increasingly larger particles of $\alpha$-$Al_2O_3$ that offer small resistance to the flow. In contrast, the symmetric tubes used exhibit the same pore size all the way across the wall thickness. This type of support should present a considerably higher resistance to flow than asymmetric supports do as a consequence of that configuration. Thus, if a similar thickness of metal is deposited, greater fluxes can be achieved with the asymmetric support.

Regarding the large difference in separation factor, it is important to note the sizable differences in support pore size shown in FIG. 16. The asymmetric support used for membranes 5 and 6 had a pore size of 50 nm while the analogous value for the symmetric tubes used for membranes 1 through 4 is 200 nm. The pore size is clearly related to surface roughness; a surface having small pores is smoother as a whole than another bearing large pores. On the smoother support a more continuous metal film with fewer defects through which $N_2$ can diffuse is likely to result.

The above reasoning provides support for the hypothesis that a thinner film is required to make a leak free membrane when a support with small pores is used. This is because it is relatively easier to cap small pores by plugging them with metal. Visible evidence that this occurs was observed in the SEM micrographs of membrane 5 as shown in FIG. 11. The metal penetrated into the pores of the support, filling them and then growing into a continuous thick layer of metal. This layer thickness appears to be more than adequate to produce a continuous film, suggesting that the thickness can be reduced even further. The next step was then to reduce the amount of metal deposited to verify this hypothesis.

Figure 12:
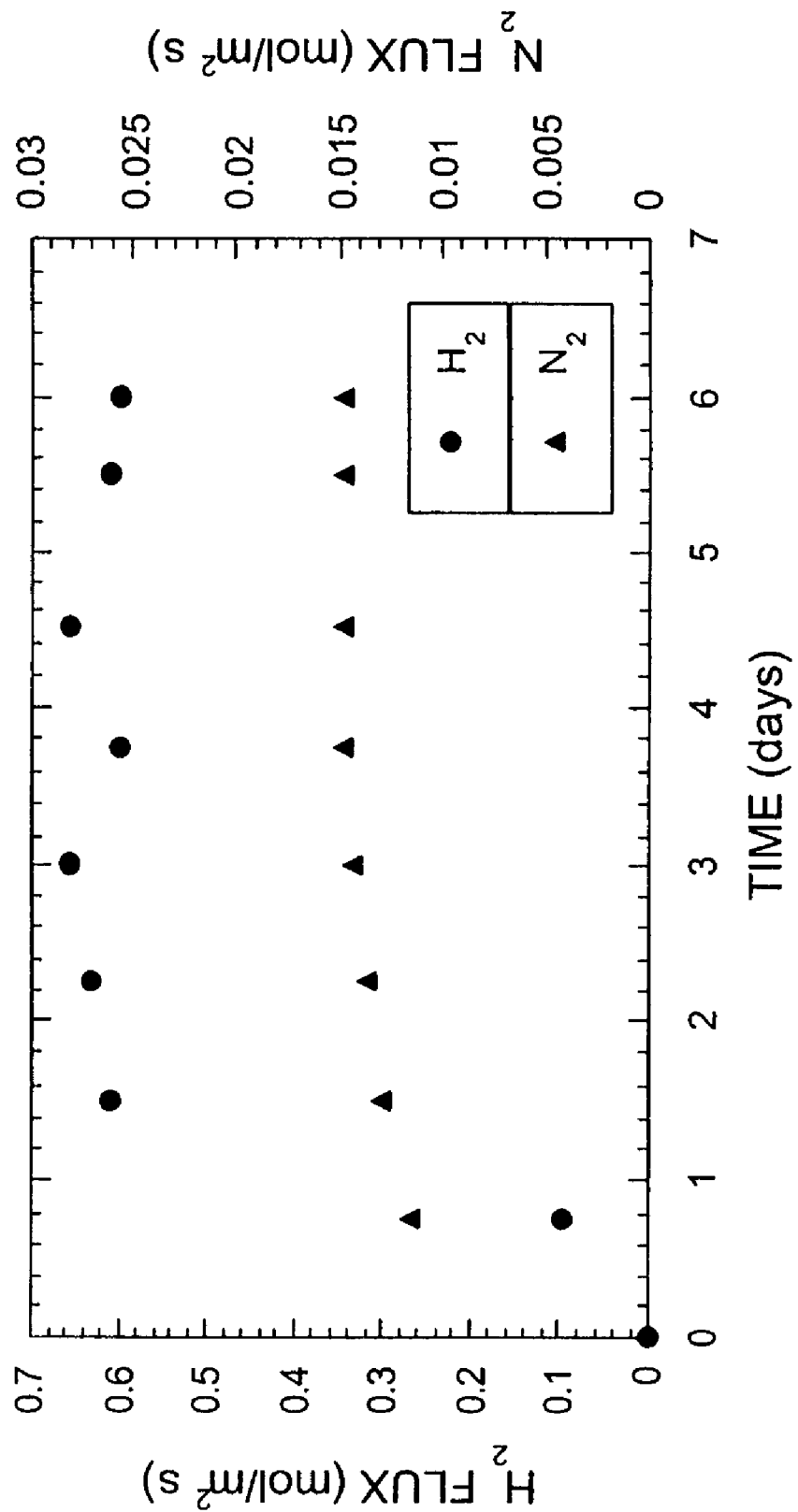
FIG. 12 shows flux data for Membrane 6. Film thickness≅1 μm, temperature=350° C. The pressure differential for permeation tests was 345 kPa.
Figure 13:
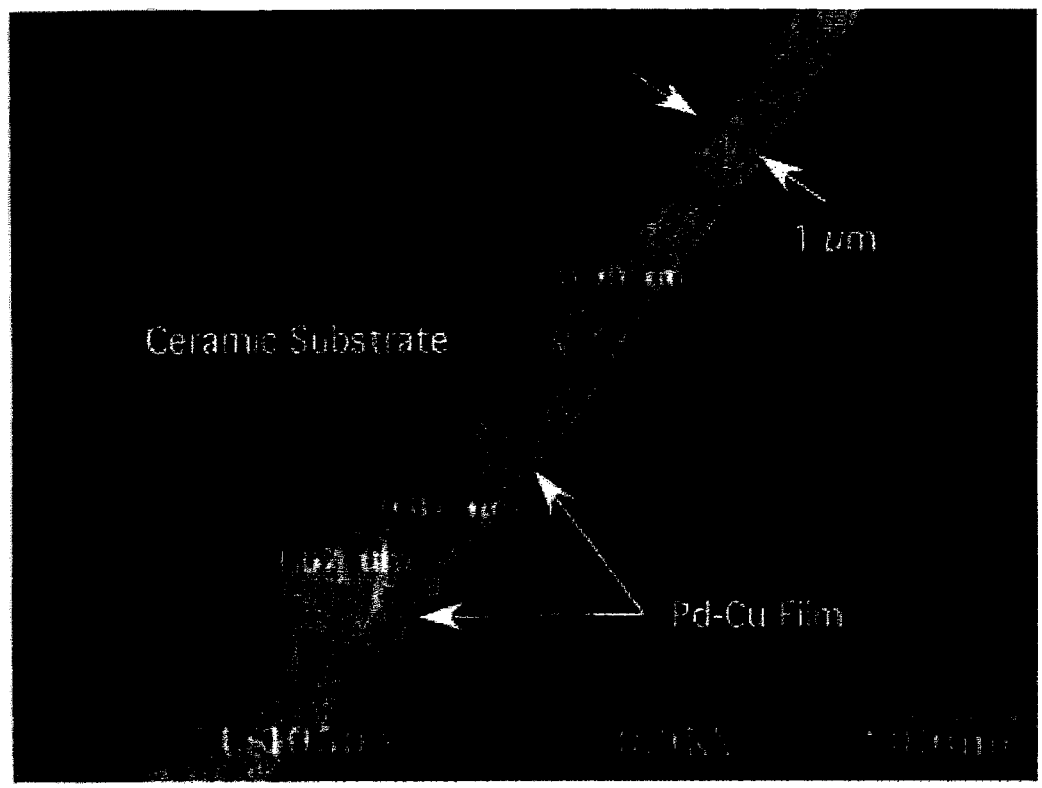
FIG. 13 is a scanning electron micrograph of membrane 6. Scalebar=2.0 μm.

Membrane 6 was made using the same asymmetric support used in membrane 5, but the total metal film thickness was only 1.5 microns. FIG. 12 shows the high temperature permeation behavior of this membrane and FIG. 13 is an SEM image of the metal layer. In observing the latter it is important to highlight that even though the metal film was very thin in comparison with what has been reported in the literature to date, it appears that a continuous film could be obtained with an even thinner film. However, the transport chart (FIG. 17 and FIG. 12) indicated an ideal $H_2/N_2$ separation was measured that was below the value for membrane 5. Still, membrane 5 compared well against all of the symmetric supported membranes in terms of both flux and separation factor. An EDAX for this membrane showed a homogeneous composition of 30 wt. % Cu.

A reasonable explanation for the lower separation factor can be found comparing the room temperature leak test results for membranes 5 and 6. According to the data in FIG. 16, the leakage rate for membrane 5 was almost twice that for membrane 6 at room temperature. At high temperature however, membrane 6 leaked 18 times more nitrogen than did number 5 as inferred from the data in FIG. 17. Evidently, the thin metal film was enough to prevent leaking at low temperature but when heated the metal crystallites may have sintered or otherwise rearranged, opening slightly covered pores in the ceramic support.

Figure 14:
FIG. 14 is a scanning electron micrograph of membrane 7. Scalebar=20.0 μm.

Membrane 7 was prepared on an even smoother asymmetric support having an $\gamma$-$Al_2O_3$ top layer, 5 nm in pore size. Several of these tubes were plated under the conditions outlined before, yet it was impossible to produce a leak free membrane, even at thickness as high as 10 microns. As Lin and coworkers [46-48] have found, initial surface roughness is a critical factor for producing leak-free membranes. The supports used present large particles and other imperfections on the surface which the metal films could not cover up, as shown in FIG. 14. Also, we suspect the pores on this support to be so small as to not provide the "interlocking" required for the electrolessly deposited metal film to adhere strongly to the ceramic wall. Future work will include supports with an intermediate pore size between 5 and 50 nm that may exhibit sufficient surface roughness to provide adhesion between the support and the Pd—Cu film.

Economics

The driving force towards thinner palladium-copper layers is twofold in nature. First, from a mass transport standpoint, thin metal films present less resistance to the flow, giving higher flux as a result, therefore enhancing productivity. Second, less palladium is needed to produce the same amount of hydrogen per unit length. This last point is also addressed with the alloying of palladium with inexpensive copper. Both of these factors contribute enormously to the overall economics of the membrane manufacture. Employing supports with small pore size reduces the amount of expensive material needed to fabricate very selective leak-free membranes. Also, the use of asymmetric supports should reduce the overall mass transfer resistance, allowing more permeate production per unit area per unit time.

For better illustrating an application of these membranes, the following information, collected for design purposes, could be considered [58, 59]. Several manufacturers are proposing to produce fuel cell power systems to produce 1 kW of electricity for residential use in Japan[59]. Production of 1 kW of electricity would require approximately 10 standard liters per minute (SLPM) of high purity hydrogen. Using membrane 5 as an example, 1.5 SLPM were produced using 5 cm of active length. Consequently, if the same type of Pd—Cu composite membrane were to be used, 30 cm of 1 cm OD membrane would be needed. The material costs to make the membrane are summarized in FIG. 18.

The bulk of the retail costs are associated with the support and not with the Pd film. A further decrease in the thickness would allow higher flux and would significantly lower the area requirements and length of support tubing needed. Several economical analyses have been carried out recently [60, 61] indicating that the high cost of metal membrane devices for hydrogen separation is due mainly to palladium. Future economic analyses of this nature may need to consider the fabrication of micron-thick Pd films, which would significantly reduce the sensitivity of the economics to the cost of the Pd metal.

CONCLUSIONS

The objective of this work was to make ceramic-supported Pd—Cu metal membranes for high temperature hydrogen separation. It was shown that the deposition of Pd and Cu using electroless plating followed by annealing to alloy the metals is a viable way of forming a thin homogenous defect free metal film capable to selectively separate hydrogen at temperatures between 350° C. and 700° C.

Controlling the deposition time during the sequential electroless plating was found to be important to tailor the thickness and composition of the film. EDAX and XRD were used to analyze the alloy composition and the metal distribution throughout the metal film.

Two support structural factors were found to have an important impact on the overall performance of the membrane. The top layer pore size determines the minimum value the metal film thickness must be in order to prevent leaking and inert gas slippage. The larger the pore size the thicker the metal layer has to be to insure an impervious membrane. However, there is a limit in how small the film can be. Although our synthetic procedures were successful for 200 nm and 50 nm substrates, we were unable to deposit a free leak film on the 5 nm cut-off $\gamma$-alumina support.

The other important factor is the internal structure of the ceramic support. An asymmetric support, made of increasingly coarser layers, presents lower resistance to the flow, therefore yielding a higher hydrogen flux if compared with a symmetric one. The latter is homogeneous all the way across its thickness.

Using the electroless plating technique it was possible to produce a palladium/copper composite membrane with average metal film thickness as small as 1.5 µm. The hydrogen flux of an 11 µm thick Pd—Cu film was 0.8 mol/$m^2$·s at 450° C. with a hydrogen/nitrogen ideal separation factor of 1150 at a □P of 345 kPa.

LITERATURE CITED

1. V. Gryaznov, Catal. Today 51 (1999) 391-5.
2. R. E. Buxbaum and A. B. Kinney, Ind. Eng. Chem. Res. 35 (1996) 530-37.
3. V. M. Gryaznov, M. M. Ermilova, S. I. Zavodchenko, and N. V. Orekhova, Polymer Sci. 35 (1993) 365-8.
4. N. M. Peachey, R. C. Snow, and R. C. Dye, J. Membr. Sci. 111 (1996) 123-133.
5. J. N. Armor, Catal. Today 25 (1995) 199-207.
6. G. Saracco, H. W. J. P. Neomagus, G. F. Versteeg, and W. P. M. van Swaaij, Chem. Eng. Sci. 54 (1999) 1997-2017.
7. S. Uemiya, Sep. Pur. Meth. 28 (1999) 51-85.
8. J. B. Hunter, Platinum Met. Rev. 4 (1960) 130-31.
9. J. K. Ali, P. Hasler, E. J. Newson, and D. W. T. Rippin, Int. J. Hydrogen Energy 19 (1994) 877-80.
10. J. P. Collins, R. W. Schwartz, R. Sehgal, T. L. Ward, C. J. Brinker, G. P. Hagen, and C. A. Udovich, Ind. Eng. Chem. Res. 35 (1996) 4398-4405.
11. H. C. Foley, A. W. Wang, B. Johnson, and J. N. Armor, ACS Symp. Ser. 517 (1993) 168-84.

12. J. N. Armor, J. Membr. Sci. 147 (1998) 217-33.
13. G. J. Grashoff, C. E. Pilkington, and C. W. Corti, Platinum Met. Rev. 27 (1983) 157-69.
14. J. B. Hunter. U.S. Pat. No. 2,773,561 (1956).
15. D. L. McKinley. U.S. Pat. No. 3,439,474 (1969).
16. D. T. Hughes and I. R. Harris, J. Less-Common Met. 61 (1978) 9-21.
17. W. Juda, C. W. Krueger, and R. T. Bombard. U.S. Pat. No. 6,103,028 (2000).
18. V. M. Gryaznov, A. P. Mishchenko, V. P. Polyakova, N. R. Roshan, E. M. Savitskii, V. S. Smirnov, E. V. Khrapova, and V. I. Shimulis, Dokl. Akad. Nauk SSSR 211 (1974) 624-7.
19. D. L. McKinley. U.S. Pat. No. 3,350,845 (1967).
20. D. Edlund. *A Membrane Reactor for H$_2$S Decomposition. in Advanced Coal-Fired Power Systems '96 Review Meeting.* 1996. Morgantown, W. Va.
21. F. N. Berseneva, N. I. Timofeev, and A. B. Zakharov, Int. J. Hydrogen Energy 18 (1993) 15-18.
22. D. Edlund, D. Newbold, and C. Frost. U.S. Pat. No. 5,646,626? (1996).
23. D. J. Edlund. EP Patent 783919 (1997).
24. F. A. Lewis, *The Palladium Hydrogen System.* 1967, London: Academic Press.
25. J. Völkl and G. Alefeld, *Hydrogen in Metals-I.* Topics in Applied Physics. Vol. 28. 1978, New York: Springer-Verlag, Berlin.
26. J. Piper, J. Appl. Phys. 37 (1966) 715-21.
27. A. G. Knapton, Platinum Met. Rev. 21 (1977) 44.
28. A. S. Zetkin, G. Y. Kagan, and Y. S. Levin, Phys. Met. Metall. 64 (1987) 130-4.
29. A. S. Zetkin, G. E. Kagan, A. N. Varaksin, and E. S. Levin, Sov. Phys. Solid State 34 (1992) 83-5.
30. R. A. Karpova and I. P. Tverdovskii, Russ. J. Phys. Chem. 33 (1959) 1393-1400.
31. T. B. Flanagan and D. M. Chisdes, Solid State Commun. 16 (1975) 529-32.
32. D. Fisher, D. M. Chisdes, and T. B. Flanagan, J. Solid State Chem. 20 (1977) 149-58.
33. M. van Swaay and C. E. Birchenall, AIME Trans. 218 (1960) 285-89.
34. A. N. Karavanov and V. M. Gryaznov, Kinet. Catal. 25 (1984) 60-62.
35. A. P. Mischenko, V. M. Gryaznov, V. S. Smirnov, E. D. Senina, I. L. Parbuzina, N. R. Roshan, V. P. Polyakova, and E. M. Savitsky. U.S. Pat. No. 4,179,470 (1979).
36. G. Barbieri, V. Violante, and E. Drioli, Ind. Eng. Chem. Res. 36 (1997) 3369-74.
37. J. Shu, B. P. A. Grandjean, E. Ghali, and S. Kaliaguine, J. Membr. Sci 77 (1993) 181-195.
38. S. Uemiya, T. Matsuda, and E. Kikuchi, J. Membr. Sci. 56 (1991) 315-325.
39. H. Kikuchi. Japan Patent JP 63294925 (1988).
40. J. N. Keuler, L. Lorenzen, R. D. Sanderson, V. Prozesky, and W. J. Przybylowicz, Nucl. Instr. Meth. Phys. Res. B 158 (1999) 678-82.
41. K. Y. Foo, M. S. Thesis, Colorado School of Mines, Golden, Colo., 1995.
42. K. Hado, E. Yasumoto, and K. Gamo. Japan Patent JP 9029079 (1997).
43. O. Sakai, S. Nakamura, T. Kawae, and H. Yoshida. Japan Patent JP 8266876 (1996).
44. E. Kikuchi and S. Uemiya, Gas Sep. Purif. 5 (1991) 261-6.
45. T. Kawae, T. Takahashi, and O. Sakai. Japan Patent JP 10203802 (1998).
46. V. Jayaraman, Y. S. Lin, M. Pakala, and R. Y. Lin, J. Membr. Sci. 99 (1995) 89-100.
47. G. Xomeritakis and Y. S. Lin, J. Membr. Sci. 133 (1997) 217-30.
48. B. McCool, G. Xomeritakis, and Y. S. Lin, J. Membr. Sci. 161 (1999) 67-76.
49. K. L. Yeung and A. Varma, AIChE J. 41 (1995) 2131.
50. K. L. Yeung, J. M. Sebastian, and A. Varna, Catal. Today 25 (1995) 231-236.
51. D. J. Edlund. U.S. Pat. No. 5,498,278 (1996).
52. J. P. Collins and J. D. Way, Ind. Eng. Chem. Res. 32 (1993) 3006-3013.
53. S. N. Paglieri, K. Y. Foo, J. D. Way, J. P. Collins, and D. L. Harper-Nixon, Ind. Eng. Chem. Res. 38 (1999) 1925-36.
54. S. N. Paglieri, Ph.D. Thesis, Colorado School of Mines, Golden, Colo., 1999.
55. S. Aggarwal, A. P. Monga, S. R. Perusse, R. Ramesh, V. Ballarotto, E. D. Williams, B. R. Chalamala, Y. Wei, and R. H. Reuss, Science 287 (2000) 2235-7.
56. T. B. Massalski, J. L. Murray, L. H. Bennett, H. Baker, L. Kacprzak, B. P. Burton, T. Weintraub, and J. Bhansali, eds. *Binary Alloy Phase Diagrams,* p. 1868. Vol. 2. 1986, American Society for Metals: U.S.
57. M. Kajiwara, S. Uemiya, and E. Kikuchi, Catalysis Today 56 (2000) 65-73.
58. S. Thomas and Zalbowitz. Fuel Cells: Green Power. Los Alamos National Laboratory LA-UR-99-3231 (1999).
59. T. Koppel and J. Reynolds. A Fuel Cell Primer: the Promise and the Pitfalls. Rev. 4 (Sep. 15, 2000).
60. A. Criscuoli, A. Basile, E. Drioli, and O. Loiacono, Journal of Membrane Science 181 (2001) 21-27.
61. S. Roy, B. G. Cox, A. M. Adris, and B. B. Pruden, Int. J. Hydrogen Energy 23 (1998) 745-752.

What is claimed is:

1. A method for making a palladium alloy composite membrane consisting of:
    seeding at least a portion of an asymmetric porous substrate for supporting a palladium alloy film with palladium crystallites to produce an activated surface, wherein said porous substrate has a pore size gradient in a range of between 20 nm to 50 nm and a pore size adjacent to said porous substrate for supporting said palladium alloy film of between about 50 nm and 5 nm;
    first plating, over said activated surface, a palladium film;
    second plating, over said palladium film, an alloying material, wherein said alloying material is gold; and
    annealing said porous substrate, said palladium film, and said alloying material so that there is intermetallic diffusion of said alloying material into said palladium film to produce said palladium alloy film over said porous substrate.

2. A method, as claimed in claim 1, wherein: said pore size adjacent said porous substrate for supporting said palladium alloy film is about 50 nm.

3. A method, as claimed in claim 1, wherein: said pore size adjacent said porous substrate for supporting said palladium alloy film is about 20 nm.

4. A method, as claimed in claim 1, wherein: said pore size adjacent said porous substrate for supporting said palladium alloy film is about 5 nm.

5. A method, as claimed in claim 1, wherein: said step of first plating has a duration that is chosen based on said pore size and a desired palladium alloy film thickness.

6. A method, as claimed in claim 1, wherein: said step of second plating has a duration that is chosen based on said pore size and a desired palladium alloy film thickness.

7. A method, as claimed in claim 1, wherein: said steps of first plating and second plating are performed so as to produce a desired weight percentage for at least one of said palladium film and said alloying material.

8. A method, as claimed in claim 7, wherein: said desired weight percentage is chosen based on a desired hydrogen flux for said palladium alloy film.

9. A method for making a palladium alloy composite membrane consisting of:
- seeding at least a portion of an asymmetric porous substrate for supporting a palladium film with palladium crystallites to produce an activated surface, wherein said porous substrate for supporting said palladium alloy film has a pore size gradient in a range of between 20 nm to 50 nm and a pore size adjacent to said porous substrate for supporting said palladium alloy film of between about 5 nm and 50 nm;
- first plating, over said activated surface, a palladium film;
- second plating, over said palladium film, an alloying material, wherein said alloying material is gold; and
- annealing said porous substrate, said palladium film, and said alloying material so that there is intermetallic diffusion of said alloying material and said palladium film to produce said palladium alloy film over said porous substrate;
- wherein said pore size is determinative of a minimum thickness for said palladium alloy film;
- wherein said steps of first plating, second plating and annealing are performed so as to produce said palladium alloy film with a film thickness that is equal or greater than said minimum thickness.

10. A method, as claimed in claim 9, wherein: said palladium alloy film thickness is between about 10 microns and about 1 micron.

11. A method, as claimed in claim 9, wherein: said palladium alloy film thickness is between about 5 microns and about 1 micron.

12. A method, as claimed in claim 9, wherein: said palladium alloy film thickness is between about 1 micron and about 2 microns.

13. A method, as claimed in claim 9, wherein: said palladium alloy film thickness is equal to about 1 micron.

14. A method, as claimed in claim 9, wherein: said steps of first plating and second plating are performed so as to produce a desired weight percentage for at least one of said palladium film and said alloying material.

15. A method, as claimed in claim 14, wherein: said desired weight percentage is chosen based on a desired hydrogen flux for said palladium alloy film.

16. A method, as claimed in claim 9, wherein: said alloying material is selected from Groups VIII and IB.

17. A method for making a palladium alloy composite membrane consisting of:
- seeding at least a portion of an asymmetric porous substrate for supporting a palladium alloy film with palladium crystallites to produce an activated surface, wherein said asymmetric porous substrate has been pre-processed and wherein the pre-processing consists of cleaning, shaping and a combination thereof;
- first plating, over said activated surface, a palladium film;
- second plating, over said palladium film, an alloying material, wherein said alloying material is gold;
- annealing said porous substrate, said palladium film, and said alloying material so that there is intermetallic diffusion of said alloying material and said palladium film to produce a palladium alloy film over said porous substrate; and
- subjecting, after said step of annealing, said porous substrate and said palladium alloy film to an air oxidation at a temperature greater than about 350° C. for a time between 5 min and 30 min.

18. A method, as claimed in claim 17, wherein: said porous substrate has a pore size adjacent to said porous substrate for supporting said palladium alloy film of about 50 nm.

19. A method, as claimed in claim 17, wherein:
- said porous substrate has a pore size adjacent to said porous substrate for supporting said palladium alloy film and said pore size is determinative of a minimum thickness for said palladium alloy film that is substantially free of leaks; and
- said steps of first plating, second plating and annealing are performed so as to produce a palladium alloy film with a film thickness that is equal to or greater than said minimum thickness.

20. A method, as claimed in claim 17, wherein at least one adjacent surface of said porous substrate for supporting said palladium alloy film are sealed.

* * * * *